United States Patent [19]
Crabtree et al.

[11] Patent Number: 5,937,084
[45] Date of Patent: Aug. 10, 1999

[54] KNOWLEDGE-BASED DOCUMENT ANALYSIS SYSTEM

[75] Inventors: Ralph N. Crabtree, Atlanta, Ga.; Antai Peng, Irvington, N.J.

[73] Assignee: NCR Corporation, Dayton, Ohio

[21] Appl. No.: 08/652,283

[22] Filed: May 22, 1996

[51] Int. Cl.⁶ .............................. G06K 9/46; G06K 9/62
[52] U.S. Cl. .................... 382/137; 382/190; 382/224; 707/500
[58] Field of Search ..................... 382/190, 175, 382/176, 228, 286, 137, 138, 139, 140, 317, 224, 225, 226, 227; 364/225.3; 707/500

[56] References Cited

U.S. PATENT DOCUMENTS

| | | | |
|---|---|---|---|
| 3,877,019 | 4/1975 | Auerbach et al. | 340/159 |
| 4,183,013 | 1/1980 | Agrawala et al. | 382/173 |
| 4,216,482 | 8/1980 | Mason | 346/129 |
| 4,736,437 | 4/1988 | Sacks et al. | 382/216 |
| 4,949,392 | 8/1990 | Barski et al. | 382/283 |
| 4,953,230 | 8/1990 | Kurose | 382/290 |
| 4,972,499 | 11/1990 | Kurosawa | 382/227 |
| 5,027,227 | 6/1991 | Kita | 358/488 |
| 5,033,101 | 7/1991 | Sood | 382/209 |
| 5,050,222 | 9/1991 | Lee | 382/176 |
| 5,093,653 | 3/1992 | Ikehira | 340/727 |
| 5,119,433 | 6/1992 | Will | 382/138 |
| 5,159,667 | 10/1992 | Borrey et al. | 707/500 |
| 5,169,140 | 12/1992 | Wenthe, Jr. | 271/228 |
| 5,181,260 | 1/1993 | Kurosu et al. | 382/289 |
| 5,187,753 | 2/1993 | Bloomberg et al. | 382/289 |
| 5,199,543 | 4/1993 | Kamagami et al. | 194/207 |
| 5,220,621 | 6/1993 | Saitoh | 382/200 |
| 5,237,628 | 8/1993 | Levitan | 382/175 |
| 5,278,624 | 1/1994 | Kamprath et al. | 355/317 |
| 5,280,370 | 1/1994 | Faust et al. | 358/488 |
| 5,293,429 | 3/1994 | Pizano et al. | 382/202 |
| 5,313,311 | 5/1994 | Brandkamp | 358/474 |

OTHER PUBLICATIONS

Esposito et al. "An Experimental Page Layout Recognition System for Office Document Automatic Classification: an Integrated Approach for Inductive Generalization." Proc. 10th International Conference on Pattern Recognition, vol. 1, pp. 557–562, Jun. 1990.

Dengel. "Initial Learning of Document Structure." Proc. 2nd International Conference on Document Analysis and Recognition, pp. 86–90, Oct. 1993.

Watanabe et al. "Toward a Practical Document Understanding of Table–Form Documents: Its Framework and Knowledge Representation." Proc. 2nd International Conference on Document Analysis and Recognition, pp. 510–515, Oct. 1993.

Hao et al. "A Tool for Classifying Office Documents." Proc. 5th International Conference on Tools with Artificial Intelligence, pp. 427–434, Nov. 1993.

*Primary Examiner*—Jon Chang
*Attorney, Agent, or Firm*—Needle & Rosenberg

[57] ABSTRACT

A knowledge-based document analysis system and method for identifying and decomposing constrained and unconstrained images of documents is disclosed. Low level features are extracted within bitonal and grayscale images. Low level features are passed to a document classification means which forms initial hypotheses about the document class. For constrained documents, the document analysis system sorts through various models to determine the exact type of document and then extracts the relevant fields for character recognition. For unconstrained documents, through the use of a blackboard architecture which includes a knowledge database and knowledge sources, the document analysis means creates information and hypotheses to identify and locate relevant fields within the document. These fields are then sent for optical character recognition.

21 Claims, 19 Drawing Sheets

FIG. 5

Boise Cascade Office Products Corporation
800 West Bryn Mawr Avenue
Hascal, Illinois 60143-1594

AOI057366

Location: ATLANTA

| MO | DAY | YR | AMOUNT OF DRAFT |
|----|-----|----|-----------------|
| 03 | 15  | 96 | E$158.11        |

PAY ******** 158 * DOLLARS AND *11 CENTS

TO THE ORDER OF:

NCR CORPORATION
ATTN: PAT DIXION, ROOM 8147
1200 PEACHTREE ST., PROMENADE I
ATLANTA,            GA.   30309

NOT NEGOTIABLE AFTER 90 DAYS
Boise Cascade Office Products Corporation

BY _Michael Blackhead_
AUTHORIZED REPRESENTATIVE

⑈501105736⑈ ⑉124100019⑈ 110003476928⑈

```
DOCTYPE PERSONAL CHECK
   60
   10
   200
   40

┌ ZONE SIGNATURE
        │ FIXED POSITION
1205 ──┤ TYPE HANDPRINT
        │ POSITION  0.65  0.9  0.55  1.0
        └ END

┌ ZONE MICR
        │ FIXED POSITION
1210 ──┤ TYPE MACHINE
        │ POSITION  0.9  0.1  0.0  1.0
        └ END

┌ ZONE LEGAL AMOUNT
        │ FIXED POSITION
1220 ──┤ TYPE MACHINE
        │ TYPE HANDPRINT
        │ POSITION  0.51  0.61  0.05  0.95
        └ END

┌ ZONE COURTESY AMOUNT
        │ FIXED POSITION
1230 ──┤ TYPE MACHINE
        │ TYPE HANDPRINT
        │ POSITION  0.37  0.5  0.75  1.0
        └ END

┌ ZONE DATE
        │ FIXED POSITION
1240 ──┤ TYPE MACHINE
        │ TYPE HANDPRINT
        │ POSITION  0.2  0.36  0.52  0.82
        └ END

END
```

```
DOCTYPE BUSINESS CHECK
   60
   10
   400
   40
```

1310
```
ZONE SIGNATURE
PROBABLILISTIC
TYPE HANDPRINT  .3   -.5
POSITION 0.7 0.9 0.6 0.8 0.5 0.7 0.0
HEIGHT 110 80 90 0.1 0.0
WIDTH 350 250 270 0.2 0.0
END
```

1320
```
ZONE MICR
PROBABLILISTIC
TYPE MACHINE  .3  -.5
Y - POSITION  0.9 1.0 0.01 0.8 0.0
HEIGHT 50 20 30 0.2 0.0
WIDTH 1000 300 350 0.3 0.0
END
```

1330
```
ZONE LEGAL AMOUNT
PROBABLILISTIC
FIELD_UNDER LEGAL 1 0
TYPE MACHINE  .3   -.5
Y - POSITION 0.2 0.8 0.3 0.6 0.2 0.3 0.0
MIN. - WIDTH 400 300 30 0.2 0.0
AND ( MIN. - HEIGHT 20 10 0.3 0.0, MAX. - HEIGHT 70 80 0.2 0.0 )
END
```

1340
```
ZONE COURTESY AMOUNT
PROBABLILISTIC
FIELD_UNDER COURTESY 1 0
TYPE MACHINE  .3   -.5
AND ( MIN. - HEIGHT 20 10 0.3 -.1, MAX. - HEIGHT 40 50 0.2 0.0 )
AND ( MIN. - WIDTH 100 50 0.3 0.0, MAX. - WIDTH 400 500 0.2 0.0 )
ENCLOSED BOX 0.2 0.0
POSITION 0.8 0.99 0.35 0.65 0.1 0.4 0.0
END
```

1350
```
ZONE DATE
PROBABLILISTIC
FIELD_UNDER DATE 1 0
TYPE MACHINE  .3   -.5
AND ( MIN. - WIDTH 100 50 0.2 0.0, MAX. - WIDTH 200 300 0.2 0.0 )
AND ( MIN. - HEIGHT 20 10 0.2 -.1, MAX. - HEIGHT 40 50 0.2 0.0 )
ENCLOSED BOX 0.2 0.0
POSITION 0.49 0.85 0.20 0.65 0.46 0.1 0.4 0.0
END
```

END

FIG. 14A

| | | | | | |
|---|---|---|---|---|---|
| [-1.9618710e-002 | -7.9558652e-002 | -1.1932687e-002 | -6.0710999e-002 | .4744524e-003 | 2.5408225e-002 |
| -4.9712111e-0003 | -1.2508920e-002 | 3.2976042e-002 | 1.6010197e-001 | 1.1788641e-002 | 3.0125618e-002 |
| -4.0262995r-005 | -1.6988581e-004 | 2.3409768e-005 | 1.1187674e-004 | 1.0209134e-004 | 4.1422676e-004 |
| 5.6134321e-002 | 2.7250948e-001 | 1.3624497e-001 | 6.1748056e-001 | 9.2007904e-002 | 2.7900949e-001 |
| 2.0882124e-003 | 9.2368753e-003 | -2.0437301e-004 | -1.9401943e-003 | -3.6805941e-003 | -1.6833290e-002 |
| 7.6910654e-004 | -1.2355957e-001 | -3.5496943e-002 | -4.3921100e-002 | 1.5240384e-003 | 1.1278603e-001 |
| -7.8560685e-002 | 7.6795086e-001 | 3.5239066e-001 | 6.2053205e-001 | 9.1486921e-002 | -4.9819752e-001 |
| -9.8480579e-001 | 3.6917347e-002 | 9.2346176e-001 | -3.4958397e-001 | 9.6811403e-001 | -1.5504325e-001 |
| 3.7272783e-002 | 1.2183051e-001 | 4.4439898e-002 | 2.7543574e-001 | -2.2597029e-002 | 9.6796810e-003 |
| -1.3796481e-001 | -5.4584441e-001 | -3.4234669e-003 | -6.5822728e-002 | 2.1266043e-001 | 7.9703418e-001 |

FIG. 14B

| | | | | |
|---|---|---|---|---|
| -2.8728321e-002 | -1.5860731e-001 | -7.0024478e-003 | -51687600e-003 | 1.9924071e-002 | 2.0640874e-002 |
| -4.9007592e-002 | -2.6803910e-001 | -2.2522010e-002 | -2.2641963e-002 | -2.3747517e-001 | -2.1034512e-001 |
| 4.3354509e-005 | 2.5043711e-004 | 1.2136665e-003 | 1.4263988e-003 | 5.1737797e-004 | 4.0037071e-004 |
| -5.8671492e-002 | -4.6415842e-001 | -1.9162453e-002 | -5.2237692e-002 | -3.8752116e-001 | -3.4457519e-001 |
| 1.6287494e-003 | 6.9072249e-003 | -2.5613557e-003 | -3.8684282e-003 | 3.0826648e-003 | 1.3009717e-003 |
| -4.6761337e-002 | -4.8490443e-002 | -1.6292899e-002 | 5.2947599e-002 | 2.3518190e-002 | 6.1778804e-002 |
| 2.8967590e-001 | -2.9215264e-001 | -3.2067134e-001 | -9.0095738e-001 | -5.3980874e-002 | -3.7906125e-001 |
| 9.4499509e-001 | -5.5974386e-002 | 9.1683605e-003 | 6981601e-001 | 6.6643601e-001 | -6.9506452e-001 |
| -6.8294235e-002 | -3.1044544e-001 | -1.6036874e-001 | -1.6923588e-001 | -5.7919770e-001 | -4.1140958e-001 |
| -9.7720859e-002 | -7.0731467e-001 | 1.7223952e-001 | 1.2954741e-001 | -9.9760617e-002 | -1.9162040e-001];

FIG. 15A

$$\begin{bmatrix} -5.1658998e+001 & -1.6968360e+002 & -1.6780771e+001 & 3.5185083e+001 & 3.5186383e+001 & 1.0135691e+002 \\ -4.2303635e+001 & -1.3201835e+002 & 2.4313736e+001 & 7.0525553e+001 & 4.4537873e+001 & 1.3723809e+002 \end{bmatrix}$$

FIG. 15B

| -8.4437604e+001 | -5.2236241e+002 | -2.0023198e+001 | -3.1259567e+001 | -1.9350457e+002 | -1.7968826e+002 |
| -5.7552185e+001 | -3.7931370e+002 | 3.2475069e+000 | -6.2407784e+000 | -1.0905137e+002 | 1.0980740e+002] |

# KNOWLEDGE-BASED DOCUMENT ANALYSIS SYSTEM

BACKGROUND OF THE INVENTION

1. Field of the Invention

The present invention relates to a document analysis system that generates a general solution for identifying a digital image of a document and fields or informational elements within the document.

2. Description of the Prior Art

The ability to automate the process of data extraction from digital images of paper greatly increases the productivity and capacity of any business. By automating the data entry process, operating costs can be reduced due to reduced manpower requirements and capacity can be increased by maximizing the throughput of data entry operations. In businesses such as banking, there is a need for high speed processing of all types of documents. Banks usually receive many types of documents that must be entered into computers. In addition new services can be offered by automating data extraction from documents. As an example, extending Automatic Teller Machines (ATM) capabilities to include document processing would allow customers to cash checks and receive funds back from the ATM. In the retail business there is a need to capture information from a customer at the point of sale. The information to be extracted could be from the customer's check or from his identification card (i.e. driver's license). Other applications for this invention is in wholesale and retail lockboxes. The more automated the process for handling payments, the lower the operating costs and the sooner the payments are credited.

To provide a robust solution, the system must be capable of processing a mixed stream of document types. Also, the system must be capable of processing fixed format documents as well as highly unconstrained documents.

To use a document analysis system the document is first scanned using one of several existing techniques such as a charged coupled device (CCD) to create a digital image representing a matrix of the black and white points on the page by a matrix of 0's and 1's. This matrix is then transmitted to a digital computer where it can be processed, displayed, identified and stored.

The requirements for processing the scanned document can be divided into two types: identification and decomposition of constrained documents and identification and decomposition of unconstrained documents.

The identification of constrained documents has been solved for various document types. For example the DP-ATM Model 5665 system produced by NCR in Dundee, Scotland, the HITC form identification system, available from NCR in Atlanta and the FIRST system developed by Quest, a division of Lucent Technologies are three systems that identify and process constrained documents. These systems classify the document as a specific type and then invoke an identification subsystem to process the type of document identified.

For unconstrained documents, some systems do locate and read specified fields. For example, to find the courtesy amount some systems search a designated area for a '$' character. However, in many cases a '$' may not be present in the field and the courtesy amount may not be within the area designated. Furthermore, these systems may not have the capability of locating other fields that are not clearly delineated. These systems include the Courtesy Amount Locator (CAL) by Quest, a division of Lucent Technologies, and Scaleable Image Item Processing System (SIIPS) available from NCR, Waterloo, Canada. Other systems attempt a trial-by-error approach. These systems search for the field in a list of locations ranked by probability of success. This brute force approach is inaccurate and inefficient as it requires a large amount of processing resources. Furthermore, these systems cannot interpret data from different document types, i.e., checks, deposit slips, and miscellaneous financial documents. All these existing systems focus on a specific task and do not analyze the overall structure of the document to derive a solution.

While it may be possible to search for a field, for example the courtesy amount, by processing each and every print field on the right side of the document, this results in a waste of processing resources since a large region of the scanned image must be searched and the region may include a large number of fields. Therefore, one of the problems that exist today in document analysis is to create a system that determines what information is useful in generating a solution for identifying a document and fields within the document. This solution would be based on information gathered from the scanned image, as well as the computational cost involved in generating the solution.

SUMMARY OF THE INVENTION

The present invention is a system for storing a graphical image of a document that contains fields or informational elements, identifying the document type, dividing the document into zones, extracting data fields from these zones and processing the data fields. The system analyzes the document format and content by exploiting global document attributes and only using document specific information when necessary. This insures a robust solution that is language independent.

Document recognition and data extraction is accomplished by an advanced document feature extractor that locates, identifies and extracts low level features within bitonal and grayscale images. Low level features include machine print text, hand print text, and vertical and horizontal lines. The low level features are passed to a document classification means which forms initial hypotheses about document identity. The document identity is passed to a document analysis means that handles both constrained and unconstrained documents. For constrained documents, the document analysis may sort through various models to determine the exact type of document and then extracts the relevant fields which are sent for optical character recognition (OCR). For unconstrained documents the system creates information and hypotheses to identify and locate relevant fields within the document. The fields located are then sent for optical character recognition (OCR).

BRIEF DESCRIPTION OF THE FIGURES OF THE DRAWINGS

FIG. 5 is a sample business check.

FIG. 12 is a document model file for personal checks.

FIG. 13 is a document model file for a business check.

FIGS. 14A and 14B is an example of a discriminant matrix.

FIGS. 15A and 15B is an example of a center matrix.

DETAILED DESCRIPTION OF THE INVENTION

Figure 1:
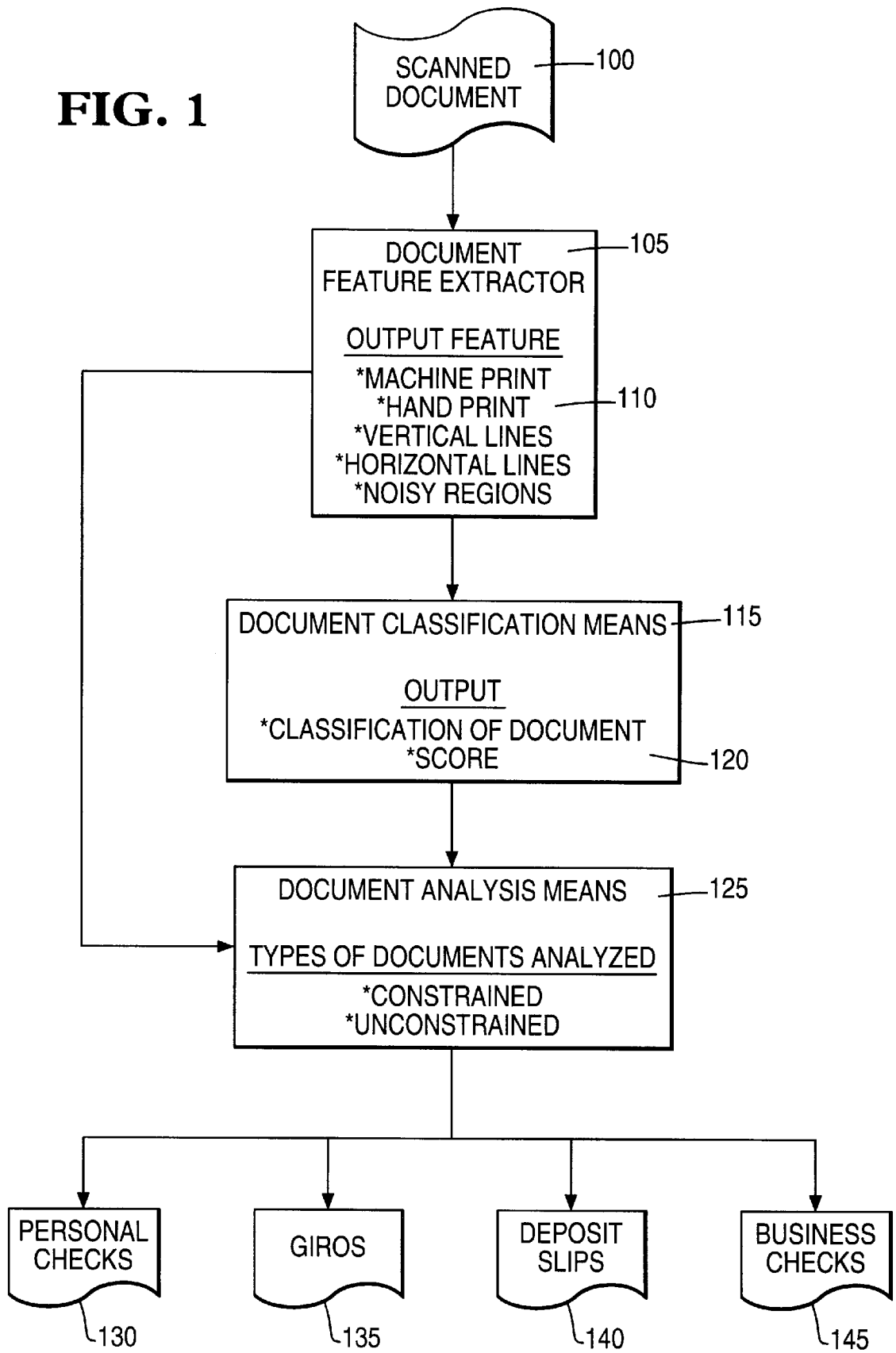
FIG. 1 is a high level description of the invention.

A preferred embodiment of the invention is now described in detail. Referring to the drawings, like numbers indicate like parts throughout the views.

Referring to FIG. 1, the input to the system is the scanned image of an unknown document 100. Document 100 contains fields of data which are informational elements. For example the informational elements for a business check include the signature line, courtesy amount, legal amount, MICR and date.

In the preferred embodiment a TIFF format scanned image is used, grey-scale (8 bits/pixel) or binary, 200, 240, 254, 300, 400, 600, 1200 or 2400 dpi, both sides of the image should be scanned and any orientation of the image is supported. The image may be uncompressed (raw) image, or a compressed (binary or grey) image. However, any image type is readily usable. The image scanned may be stored on any storage media including hard disk.

I. Document Feature Extractor

From the scanned image 100 it is possible, using a Document Feature Extractor 105 to locate and identify basic features of the document. These basic features may include machine print, hand print, vertical lines, horizontal lines and noisy regions within the digital image of the document 110.

The Document Feature Extractor 105 identifies the four corners of a rectangle that enclose individual document features. Features that are positioned close to one another or of the same type may be clustered into a single feature. For example, characters that compose an individual machine print word may be grouped into a single machine print feature, as well as multiple machine print words that are located close together within the document. The output of the Document Feature Extractor is the location and type indicator for each document feature. An example of a Document Feature Extractor 105 is the Net32K product available from AT&T Laboratories in Holmdel, N.J.

Other features, systems and methods that can be used as the Document Feature Extractor or as part of the Document Feature Extractor are disclosed in A High Speed Image Understanding System in *Adaptive Analog VLSI Neural Systems* by M. A. Jabri, R. J. Coggins, and B. G. Flower, published by Chapman & Hall 1996, ISBN 0-412-61630-0; Analysis of Complex and Noisy Check Images, *Proceedings of IEEE International Conference on Image Processing*, pp. 316–319, published by IEEE Computer Society Press 1996, ISBN 0-8186-7310; A Neural Network Accelerator for Image Analysis, *IEEE Micro*, vol. 15, number 3, June 1995, published by IEEE Computer Society Press 1995; Net32K High Speed Image Understanding System, *Proceedings of the Fourth International Conference on Microelectronics for Neural Networks and Fuzzy Systems* (Microneuro '95), pp. 413–421, published by IEEE Computer Society Press 1995; Address Block Location with a Neural Net System, *Advances in Neural Information Processing Systems*, vol. 6, pp. 785–792, published by Morgan-Kaufman Publishers 1994.

The location and type indicator for each document feature is passed to the Document Classification Means 115. The Document Classification Means 115 identifies the general document class of the document scanned from the set of low level features extracted by the Document Feature Extractor 105. A general document class is for example fixed format document with a high degree of linear features such as giros or single fixed format documents such as United States ANSI standard personal checks or an unconstrained document such as a business check.

The output of the Document Classification Means 115 is an ordered list of classification hypotheses, consisting of a document type identifier and a score which indicates the confidence level of the hypothesis 120. Details of the Document Classification Means are described below.

The output features 110 of the Document Feature Extractor 105 and the ordered list of classification hypotheses 120 from the Document Classification Engine 115 are passed to the Document Analysis Means 125. The Document Analysis Means 125 locates relevant areas or zones within the document. For example, for a U.S. business check 145 or personal check 130, the Document Analysis Means 125 outputs the location and print type of the courtesy amount, legal amount, MICR, date, and signature zone. Details of the Document Analysis Means are described below.

In the preferred embodiment of this invention, the code for the Document Classification Means and the Document Analysis Means may be written in Microsoft Visual C++. The software may run on an Intel 486, Pentium or Pentium Pro platform under Windows NT or Windows '95. It also may utilize the Win32 application subsystem.

Figure 16:
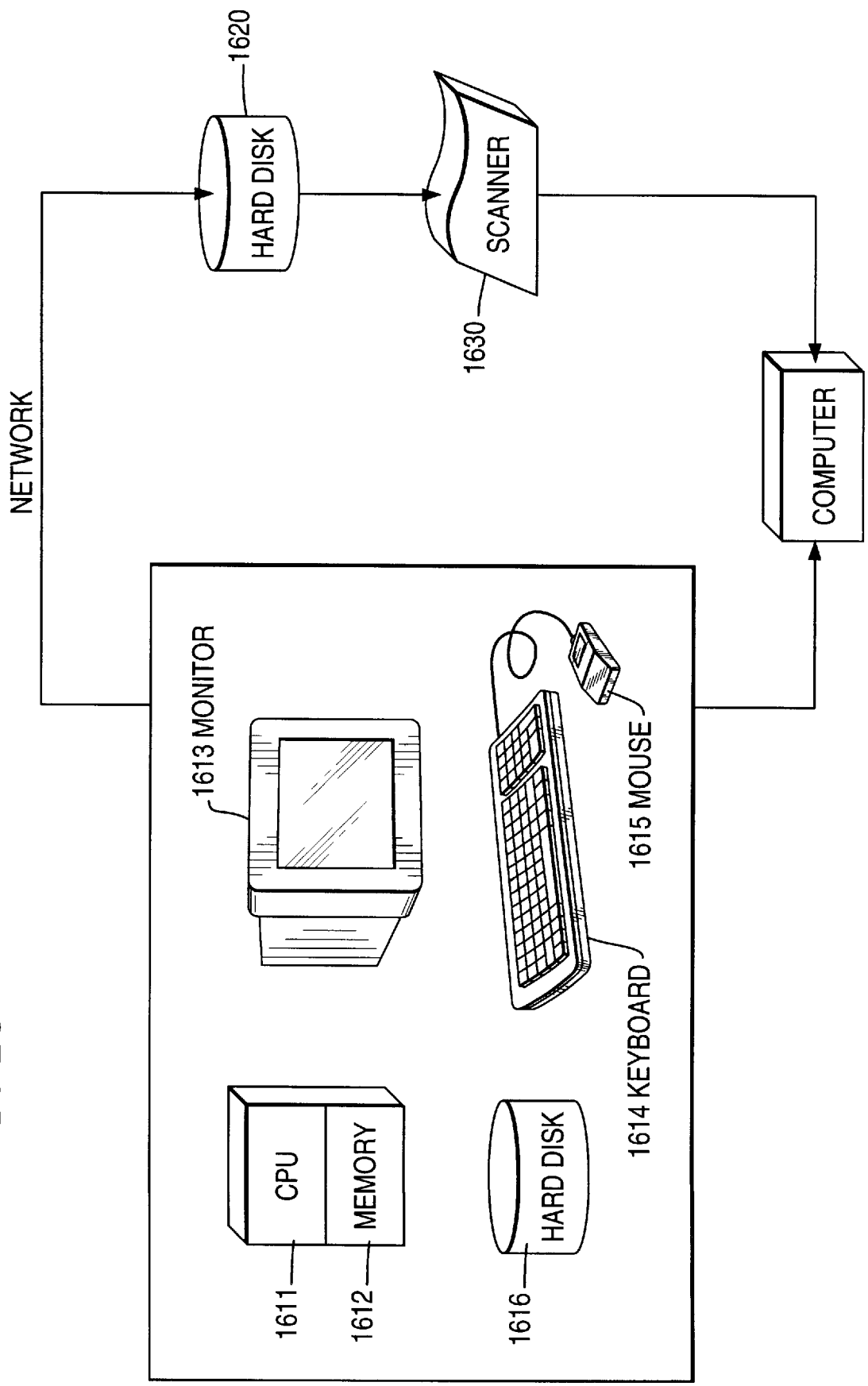
FIG. 16 is an example of the hardware setup for developing the invention.

One setup of a system for developing the invention is set forth in FIG. 16. A computer 1610 is shown which contains a monitor 1613, keyboard 1614, a mouse 1615, a central processing unit 1611 which can be an Intel 486, Pentium or Pentium Pro processor, memory 1612, and a hard disk 1616. The computer 1610 may be connected to a network. The network may contain hard disks 1620 and a scanner 1630. The scanner 1630 is used to scan the document into an image that can be stored either on hard disks 1620 or 1616. While this configuration is disclosed for the preferred embodiment, equivalent hardware systems or configurations may be substituted.

II. Document Classification Means

Document classification is divided into two parts: training and run-time. During system training, immediate features such as machine print, hand print, vertical lines and horizontal lines are extracted from a set of sample documents using the Document Feature Extractor 105. A set of indirect features are then computed based on the set of immediate features. Indirect features are created by putting together immediate features. A list of indirect features may include: image width, document boundary width, horizontal line total length, horizontal line total count, horizontal line average length, vertical line total length, vertical line total count, vertical line average length, machine print total area, machine print total count, machine print average area, hand print total area, hand print total count, hand print average area, machine print vs. hand print area ratio, machine print vs. hand print count ratio, machine print vs. hand print average area ratio, and total number of boxes.

Based on the set of immediate and indirect features, a set of discriminant vectors, one for each document class, is derived from optimizing a Fischer criteria using standard statistical procedures. The Fischer criteria is based on the concept that features from different fields on the document are spaced apart, while features from the same field are clustered together. Information from the discriminant vectors are stored as a file that is used at run-time.

At run-time, immediate features are read from the Document Feature Extractor 105 and indirect features are generated. Both the immediate features and the indirect features for the document read form a test set of features. The test set of features are put in a matrix and projected onto the discriminant vector for each class of document (implicitly the discriminant vector includes the features for that class of document). The result of the projection is a value indicating the distance between the test set of features and the features for each document class. The document is classified as belonging to the document class that has the smallest projection value.

For example, given the image vector of the form

1st column: Bounding box width of the image

2nd column: Bounding box height of the image

3rd column: horizontal line length

4th column: vertical line total count

5th column: vertical line average length

6th column: machine print total area

7th column: machine print total count

8th column: machine print average area

9th column: machine/hand print total area ratio

10th column: machine/hand print total count ratio image_vector=[1632 730 31727 8 151.88 259 41 6.34 63.9 66.3]

The values in the image_vector are values for each of the ten features of the business check defined above. These values represent the pixel values for those features.

Given the discriminant vector shown in FIGS. 14A and 14B for the six pairs of possible combinations of four forms (Business Check, Deposit Slip, Giro, Personal Check):

1. Business Check vs. Deposit Slip
2. Business Check vs. Giro
3. Business Check vs. Personal Check
4. Deposit Slip vs. Giro
5. Deposit Slip vs. Personal Check
6. Giro vs. Personal Check discriminant_vector=[FIGS. 14A and 14B]

Given the center vector shown in FIGS. 15A and 15B, a 12×2 vector for the six pairs of possible combinations of four forms:

center_vector=[FIGS. 15A and 15B]

For testing the first pair, the discriminant vector for the first pair (Business Check vs. Deposit Slip) is selected:

| first_pair_discriminant_vector = [ | |
|---|---|
| −1.9618710e-002 | −7.9558652e-002 |
| −4.9712111e-003 | −1.2508920e-002 |
| −4.0262995e-005 | −1.6988581e-004 |
| 5.6134321e-002 | 2.7250948e-001 |
| 2.0882124e-003 | 9.2368753e-003 |
| 7.6910654e-004 | −1.2355957e-001 |
| −7.8560685e-002 | 7.6795086e-001 |
| −9.8480579e-001 | 3.6917347e-002 |
| 3.7227283e-002 | 1.2183051e-001 |
| −1.3796481e-001 | −5.4584441e-001] |

To get a projection vector, the image_vector is multiplied with the first_pair_discriminant_vector:

projection_vector=image_vector * pair_discriminant_vector.

The center vector for the same pair (Business Check vs. Deposit Slip) is selected:

business_check_center_vector=[−5.1658998e+001−1.6968360e+002]

deposit_slip_center_vector=−423.03635e+001−1.3201835e+002]

The distance from the current image to the business check is computed:

dist_business_check=norm(projection_vector−business_check_center_vector)

dist_business_check=0.5759.

The distance from the current image to the deposit slip computed:

dist_deposit_slip=norm(projection_vector−deposit_slip_center_vector)

dist_deposit_slip=38.7298.

$$\mathrm{norm}\sqrt{(x_1 - y_1)^2 + (x_2 - y_2)^2 \ldots + (x_n - y_n)^2}$$

Since the distance to the business check is smaller, one credit is given to business check. By the same process, the distance to the possible six pairs is computed and the final results are:

Business Check=3 credits

Deposit Slip=0 credit

Giro=2 credits

Personal Check=1 credit

The system therefore concludes that the image is a Business Check.

III. Document Analysis Means

The Document Analysis Means 125 processes constrained and unconstrained documents differently. If the document is identified by the Document Classification Means as constrained, the document analysis means sorts through various model documents of the type identified and extracts the fields that are relevant for the document identified. For personal checks, the document model file is accessed, as explained below, and the relevant fields are located. For giros and deposit slips, the system sorts through various model files for the type of document and the relevant fields are located. The sorting through files for giros and deposit slips may be accomplished by systems that process constrained documents such as the DP-ATM Model 5665 produced by NCR in Dundee, Scotland.

For unconstrained documents, the problem is more complex. We therefore start by explaining the problem solving model used by the invention. Most problem solving models generally use a backward-reasoning process or forward-reasoning process in order to construct a solution. In a backward-reasoning approach, the system attempts to reason backward from a goal to be achieved to an initial data state. This type of system is often implemented as a rule based system, where if-then rules are defined and the system performs inference in order to work backwards from the goal state to the initial state. This problem approach is similar in nature to top-down model based problem solutions. In forward reasoning, the system attempts to reason forward from the initial data state to the goal state. Again, this is often achieved by inference rules, with the rules being applied to the current set of information until a goal state is found. This problem approach is very similar to bottom-up data driven problem solutions. Regardless of the model selected, both approaches require the system to determine when and how information should be applied to generate the problem solution.

Figure 2:
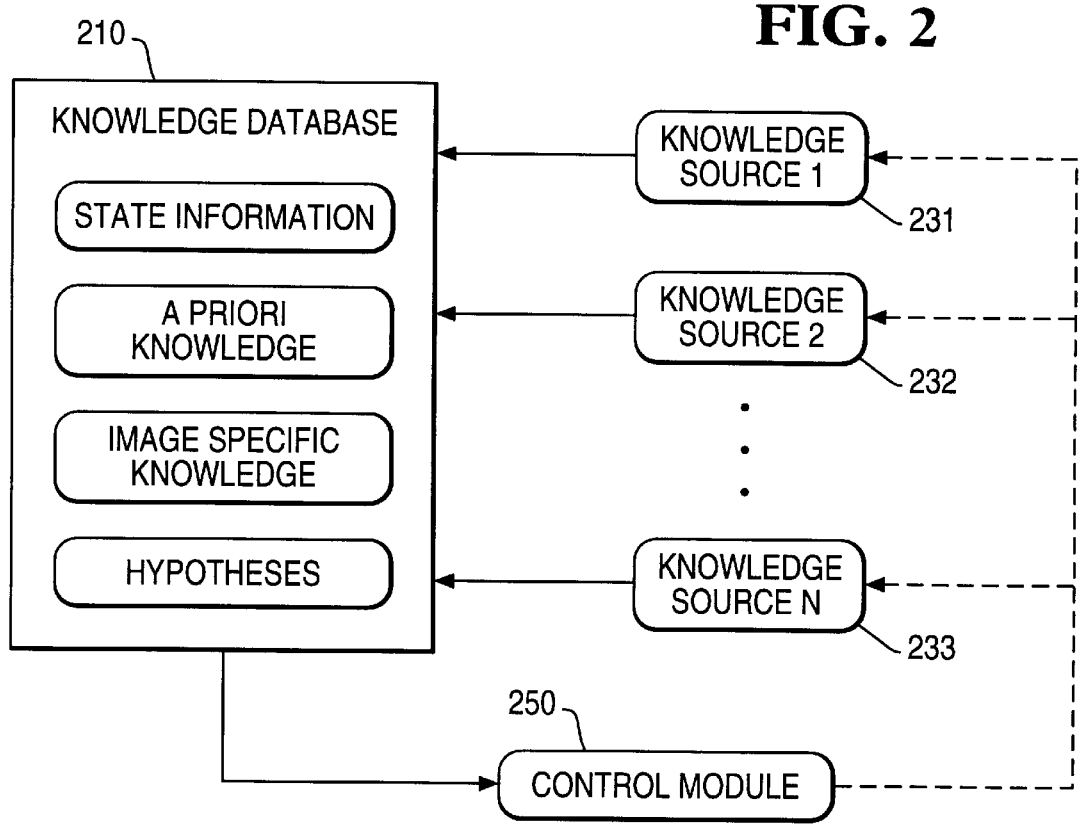
FIG. 2 is a breakdown of the Document Analysis Means.

Rather than be bound by either solution model, the document analysis system taught by this invention applies information in an opportunistic manner. Dependent upon the state of the system, the system dynamically determines which of the two approaches will yield the most useful information to derive a solution. To achieve this dynamic process flow, the document analysis system is implemented as a blackboard architecture. Referring to FIG. 2, the document analysis means 125 consists of three components: knowledge sources 231, 232 and 233, a control module 250, and a knowledge database 210.

The knowledge database 210 is the repository of all information and data in the system. The knowledge database 210 contains general a priori knowledge in the form of document models, specific information about the current image being processed, as well as hypotheses created by the system. The knowledge sources 231–233 communicate with each other via the knowledge database 210.

Knowledge sources 231–233 consist of a set of procedures or subsystems that are invoked to add to the current set of information contained within the knowledge database 210. Inputs to knowledge sources are stored in the knowledge database. The output of each knowledge source is stored in the knowledge database so that other knowledge sources can access the data. Knowledge sources may be simple procedures, or in some instances may be complete systems, such as the Net32K or field understanding engines such as optical character recognition systems.

A control module 250 is required to control the firing or invocation of knowledge sources 231–233. The control module monitors the state of the knowledge database 210, determining the best knowledge source to activate given the current state of the system. This scheduling activity is where the system selects to perform forward reasoning versus backward reasoning.

A. Knowledge Database

Information in the knowledge database 210 may be subdivided into the following types of information: image specific knowledge, a priori general knowledge, hypotheses, and system state information.

1. Image Specific Knowledge

Image specific knowledge is information that is derived from the scanned image such as machine print features or boxes. Information on the scanned image is subdivided into two sets: tokens and complex objects. Tokens are the smallest unit of information. Tokens are generated by Net32K and may divided into five types of objects: machine print tokens, hand print tokens, vertical line tokens, horizontal line tokens and graphical object or noise tokens.

Each token is represented as an object in the system and contains information that describes the size and location of the token, the type of token, and a confidence level generated by Net32K. The confidence level indicates the confidence of the token type. Associated with each machine print and hand print token is an additional field that contains the results of recognition operations performed on the token. This field is provided by the field understanding engines in the knowledge database.

Figure 3:
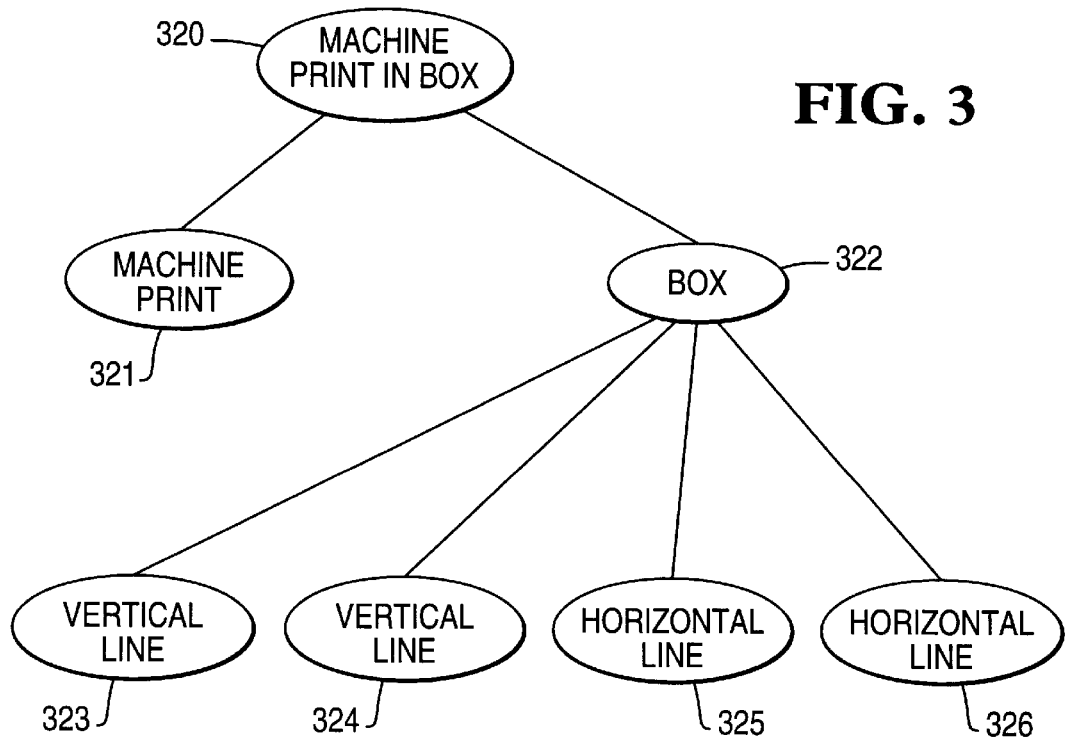
FIG. 3 is a representation of a complex object.

Complex objects are structures that represent relationships between tokens or objects and other complex objects. As shown in FIG. 3, complex objects are represented as a directed graph, where each node defines a relationship that exists between other objects in the graph. In many instances, each node is a new object. As an example, FIG. 3 shows the data structure to represent a machine print object that is contained within a box. A machine print object 320 is represented as machine print 321 and a box 322. The box 322 is represented by its components, vertical lines 323 and 324 and horizontal lines 325 and 326. The data contained within each node, or object, consists of an object identifier, a confidence level, reference to the constituent objects or tokens that compose the new object, and information describing the size and location of the object.

Figure 4:
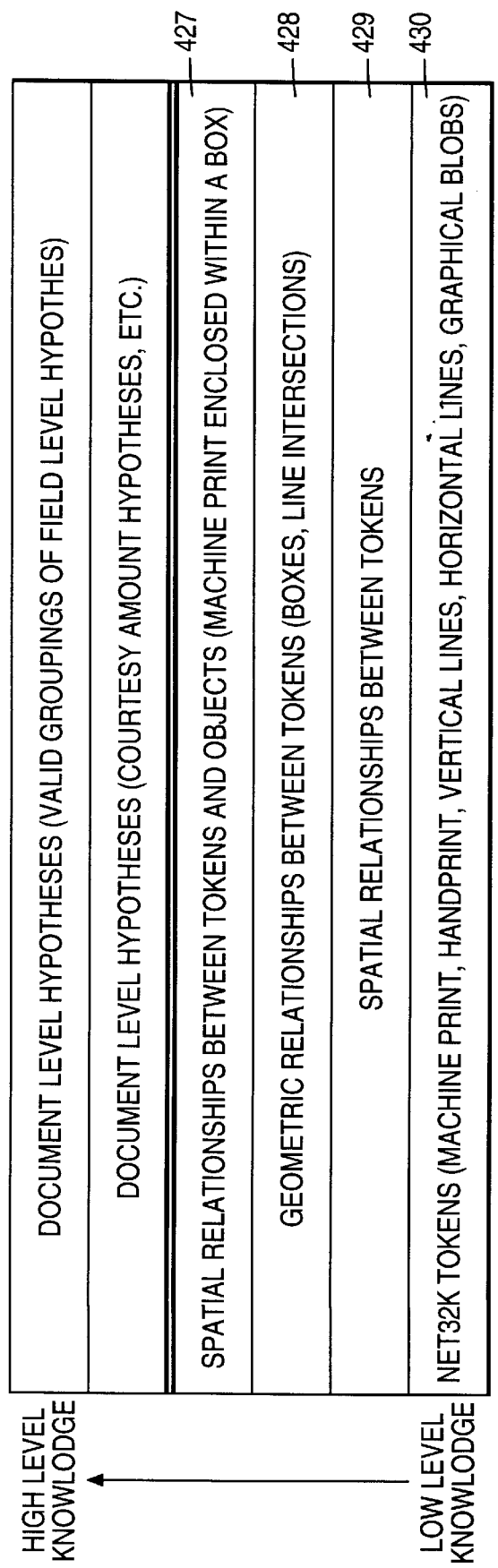
FIG. 4 is an example of the hierarchy of information in the Knowledge Database.

The information contained within the knowledge database 210 is partitioned into a hierarchy of knowledge. Complex objects are structured from more primitive objects. Information can be therefore partitioned as shown in FIG. 4. Tokens 430 are at the bottom of the hierarchy. The next level up, 429, are objects formed by the spatial relationships between tokens. For example two horizontal lines 0.05 inches apart. The next level in the hierarchy 428 includes more objects formed by geometric relationships between objects or tokens. For example line intersections forming boxes. The highest level may be spatial relationships between tokens and objects 427 as described for FIG. 5.

The following information describing spatial relationships between tokens may be represented in the system.

groups of tokens based on horizontal location groups of tokens based on vertical location isolated tokens In many cases, machine print tokens or hand print tokens that are located on the same line of text can be grouped together as a single token. In FIG. 5, the text

PAY *******158*DOLLARS AND *11CENTS may be identified as multiple machine print tokens by the Net32K board. However, with respect to the overall document composition, these fields are grouped into a single line of machine print text, since they are approximately the same font size, located on approximately the same position on the y-axis, and located closely together.

Similar to the grouping of tokens into a line of text, vertical grouping of text can be performed in order to create blocks of text. In FIG. 5, the text

NCR CORPORATION

ATTN: PAT DIXON, ROOM 8147

1200 P'TREE ST., PROMENADE I

ATLANTA, GA 30309 may first be grouped horizontally to form four individual lines of text. Next, the relationship between the lines of text can be analyzed to determine if the text forms a block of text.

There can also be represented geometric relationships between tokens. These are restricted to information that can be derived from the horizontal and vertical line tokens created by Net32K. These relations listed can include line intersections, simple and complex boxes.

Line intersections are self explanatory. Simple boxes are boxes that are created by examining the endpoints of line segments. Complex boxes are boxes that are created by including line intersections, rather than only analyzing line endpoints for boxes. In general, simple boxes form the largest box that encompasses smaller, complex boxes, if complex boxes exist.

Figure 6:
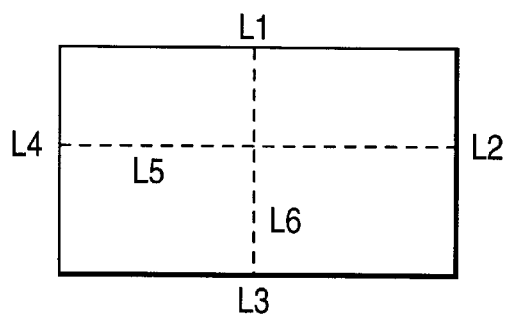
FIG. 6 is an example of simple and complex boxes.

FIG. 6 illustrates simple and complex boxes. The simple box is denoted by the solid line, and is created by lines L1, L2, L3, and L4. The complex boxes, or boxes contained within the simple box, are created by the following set of lines.

<L1, L4, L5, L6>
<L1, L2, L5, L6>
<L3, L4, L5, L6>
<L3, L2, L5, L6>

After complex objects have been created, spatial relationships between objects are formed such as enclosed objects. Enclosed objects refer to objects or tokens that are enclosed by either a simple box or a complex box. Other types of spatial relationships may include underlined objects, or objects that have headers or labels.

2. A Priori General Knowledge

Given the variety of documents that can be processed by the system, a priori general knowledge can be represented in various forms. Prior to discussing the representation of this information in the system, the information that is represented must be defined.

To perform the initial classification process, general characteristics of the various document types must be identified. For example, giros can be described as documents that generally contain a mix of machine print and linear features, with little or any hand print features present in the document. These documents often contain a large number of linear features.

U.S. personal checks generally contain a mix of machine print and hand print features, with a fairly large number of hand print features. Since the document layout is controlled by ANSI standards, the location of specific hand print features can also be exploited to perform the classification process. In cases where the check has been typed, this definition will not classify the document as a personal check. This is actually not a problem, since the document would be classified as a business check and the correct information would be located by the business check processor.

Business checks generally contain a mix of machine print and linear features. However, the linear features are not as prevalent in a business check. Also, most business checks contain a signature in the lower right portion of the document to help differentiate between giros and business checks.

Deposit slips generally contain a mixture of machine print, hand print, and linear features. However, in image ready deposit slips, the line features will drop out leaving primarily machine print and hand print features. The hand print features generally do not match the layout of a personal check, making the classification process viable.

The approach used for modeling a constrained document is simple since all the fields are at a predefined location. An example of a model file for a personal check is shown in FIG. 12. As shown in FIG. 12, the model file is broken into zones. These zones include a signature zone 1205, MICR zone 1210, legal amount zone 1220, courtesy amount zone 1230 and date zone 1240. Each zone contains fields which further identify the zone. For example the signature zone contains the following fields: fixed position, type hand print, and position 0.65, 0.9, 0.55 and 1.0 (these are representative of Ymin, Ymax, Xmin and Xmax: For example given 0,0 as the top left corner of the check, the signature should be contained in the box formed by the four points (0.55, 0.65) (1.0, 0.65) (0.55, 0.9) and (1.0, 0.9). This data is interpreted to mean that the signature zone of a personal check is a fixed position field, it is hand printed and in the box designated by the position field.

The approach used for modeling a business check is more complicated since this is an unconstrained document. The approach is to define the set of attributes or properties that can be used to distinguish a field within a business check from other fields or extraneous information. As an example, a courtesy amount field may have the following attributes: machine print field, right area location, short field length, enclosed by a box, field contains '$' or '*', field contains numeric data, font size is approximately equivalent to the legal amount field, field to the right of the legal amount field, field located above the signature field. A legal amount field may contain the following attributes: machine print, location in the right area, long field, '*", alphanumeric data, font size approximately equivalent to the courtesy amount field, field to left of courtesy amount, field higher than signature field. A signature zone may contain the following attributes: hand print, located in the right bottom area, large field size, field is below the courtesy amount, field below the legal amount. The data zone is a machine print field. The MICR zone may contain the following attributes: machine print field, bottom location, long length, numeric data, font size in pixels.

Given the set of attributes for each field, candidate zones are identified for each object based on local information kept by the object. A simple rule based processor that evaluates each attribute as true or false in order to determine if a token or object meets the field requirements is appropriate. However, in most cases not every attribute is true. For example, the courtesy amount may not be enclosed in a box or may not contain a '$' or '*'. As a result, the set of attributes should be viewed as a set of heuristic that are used to locate candidates for the individual fields.

Since the attributes are considered as heuristics, a weight or value is assigned to each attribute to determine the amount of supporting evidence each attribute contributes in identifying a zone. Also, given that some attributes must be true, it should be possible to assign a negative weight to attributes that are proven false. These weights are used to generate probabilities that correspond to the degree of match with the model.

Figure 7:
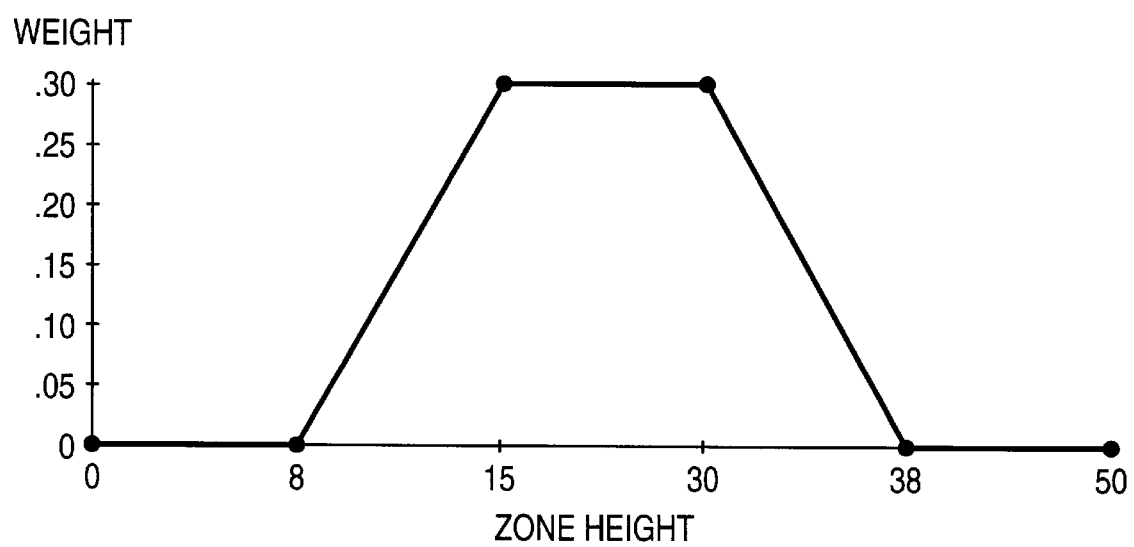
FIG. 7 is a graph of the height attribute in a document model file.

The definition of true and false is fuzzy with some attributes. If the attribute specifies a location or size, there may be a range where the attribute should be considered true, false, or partially true. For example, assume the attribute is that the zone height is between 15 pixels and 30 pixels. If the height for a candidate zone is 14 pixels, it does not make sense to mark the attribute as false, since the zone is very close to meeting the requirement of the attribute. The solution is to treat attributes not as binary relations, but adjust the score according to the degree of match with the attribute. The graph in FIG. 7 shows an example for the height attribute. If the height constraint is met, the score is 0.3. If the height is within 8 pixels of the constraint, the score is adjusted based on the distance from the defined height constraint using a linear formula. If the height difference is greater than 8 pixels, the score is 0.0.

In the current document analysis system, a field model, the attributes for a particular field as represented in the zones of the document model file, is implemented as a C++ object that is created and then instantiated with a set of attributes and weights from an input file. In this way, additional fields can be supported by simply creating a new model object and loading the appropriate model file.

An example of a model file for a business check is shown in FIG. 13. These zones include a signature zone 1310, an MICR zone 1320, a legal amount zone 1330, a courtesy amount zone 1340 and a date zone 1350. The signature zone for a business check is not in fixed position. It is probabilistic which means that it may or may not be found in the location or with the print type specified in the signature zone. Because of this uncertainty, confidence values are computed for each zone. For example, if the field found is hand print, a confidence value of 0.3 is assigned. If it is not hand print a confidence value of −0.5 is assigned. For the position of the signature field it should be bounded by the box formed by 0.7, 0.9, 0.6 and 0.8 (Xmin, Xmax, Ymin and Ymax: Box designated by these four points (0.7, 0.6) (0.7, 0.8) (0.9, 0.6) (0.9, 0.8). Since this field is probabilistic, the box that encloses the Net32K token is also taken into consideration. If the Net32K box overlaps the box in the signature zone then a confidence value of 0.7 is assigned. If the two boxes do not overlap and the distance is greater than 0.5 inches, a confidence value of 0 is assigned. If the boxes overlap and their distance apart is from 0.1–0.5 inches then a confidence value between 0 and 0.7 is assigned. For the height, if it is 110±80 pixels in height then a confidence value of 0.1 is given. If the field is 110±90 pixels in height then a confidence value of 0.0 is given. For the width, if it is 350±250 pixels in width a confidence value of 0.2 is assigned. If the width is 350±270 a confidence value of 0 is assigned.

The process of whether an object matches a field is as follows: The object attributes are compared against the zones or field model attributes in the document model file; confidence values are calculated as explained for the example in FIG. 8; the confidence values for each attribute comparison are added to obtain a zone or field model confidence value; the object is matched to the field model or zone with the highest confidence value.

3. Hypotheses

From the image specific knowledge and from the priori general knowledge supplied to the knowledge database, various hypotheses can be generated The structure and impact of hypotheses vary according to the type of hypotheses. Hypotheses can be classified as three types: (1) document classification hypotheses; (2) field level hypotheses; and (3) overall document composition hypotheses.

Document classification hypotheses are hypotheses about the current type of document being processed, such as a business check, giro, deposit slip, or personal check. These hypotheses are derived from the models of generic document composition as described for the priori general knowledge, and are used to guide the system in performing the document decomposition or identification step.

Field level hypotheses are hypotheses pertaining to individual fields within the document. The fields being considered are determined by the current document classification hypothesis being explored. If the highest ranking document classification hypothesis indicates a business check, the field level hypotheses are for the courtesy amount field, legal amount field, and other fields that must be located and recognized on the business check. For a giro, where the only problem is document identification, there are no field level hypotheses, since the location of fields is implicit in the identification of the document.

Field level hypotheses may consist of the following data.
1. hypothesis identifier. The hypothesis identifier indicates the hypothesis type, i.e. courtesy amount field hypothesis, signature field hypothesis, etc. The value of this field is static after hypothesis creation.
2. object reference. The object reference is a reference to the token or complex object to which the hypothesis applies. A hypothesis can only reference one object or token, and the reference is static after creation of the hypothesis.
3. confidence value. The confidence value is the probability that the referenced object is actually an instance of the field. This value is dynamic, since as new information is obtained relative to the object or token, the confidence value will change.
4. hypothesis evidence. The hypothesis evidence consists of the status of each attribute that is contained in the field level model, as well as the degree to which the status of the attribute impacts the confidence score. An attribute is either true, false, or unknown. As discussed earlier, an attribute may be false and still contribute to the confidence score. Hypothesis evidence is useful in determining what type of information is required to help provide evidence to support the hypothesis or prove the hypothesis false, as well as for understanding how the system determines field level hypotheses.

Figure 8:
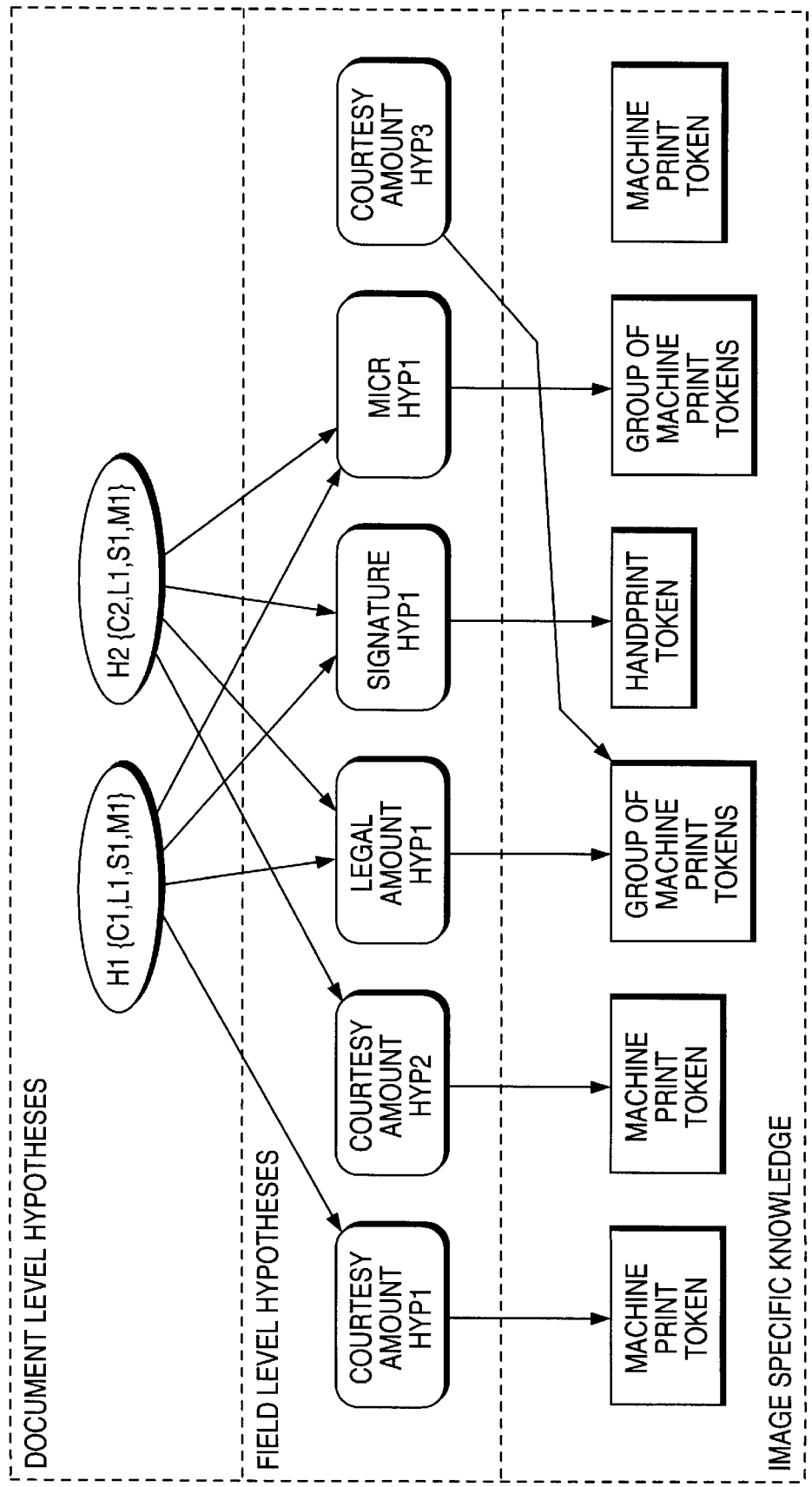
FIG. 8 is a hypotheses graph.

Hypotheses about overall document composition are generated by creating valid tuples, or combinations, of field level hypotheses. A valid business check tuple consists of field level hypotheses for each zone of interest that meets the constraints defined in the model of the overall document composition for a business check. In instances where not all fields exist within the image, the tuple would contain a NULL entry for that field. It should be realized that a single field level hypothesis may be included in more than one tuple, since a valid tuple may exist with more than one combination of fields. FIG. 8 illustrates the relationship between field level hypotheses, document level hypotheses, and tokens or objects.

In FIG. 8, there are two document level hypotheses that exist. Hypothesis H1 consists of the tuple {C1,L1,S1,M1} and hypothesis H2 consists of the tuple {C2,L1,S1,M1}. The hypotheses H1 and H2 share the same hypotheses for legal amount, signature, and MICR, with the only difference being in the courtesy amount zone. Note that there is a third possible tuple, {C3,L1,S1,M1}. However, this tuple fails to meet the constraints specified in the document model and a hypothesis is not created for this combination. Field level hypotheses that cannot be grouped with other fields, such as courtesy amount hypothesis 3, remain as field level hypotheses. Similar to field level hypotheses not associated with document level hypotheses, there exist image specific knowledge that is not associated with any field level hypotheses.

The information stored within a document level hypothesis is very similar to a field level hypothesis. The primary difference is that the object reference is to field level hypotheses, and consists of a variable number of field level hypotheses references.

Both hypothesis creation and hypothesis updates are implemented as a knowledge source. As a result, these tasks are managed by the control module that is responsible for scheduling the execution of knowledge sources. A description of the control module follows.

4. State Information

State information consist of data that is required to control and monitor the system. The state information is information that the control means or scheduler requires to determine what knowledge source to execute next. This information is explained as part of the control means.

B. Knowledge Sources

A knowledge source is a procedure or subsystem that is invoked to generate additional knowledge. The input to a knowledge source is information contained in the knowledge database, generally in the form of tokens, objects, or additional parameters that impact the results of the knowledge source.

Each knowledge source is an object, in the context of programming, that has the following attributes: set of activation events, set of preconditions, cost, benefit, and performance statistics.

For a knowledge source to become executable, a set of data must be created by the system that is compatible with the inputs to the knowledge source. By definition, the inputs to a knowledge source are a set of tokens and objects that are used by the knowledge source to generate new information. As a result, the set of inputs are well defined Rather than have a knowledge source search the knowledge database for this input data, it is more efficient to define a set of events that represent the creation of specific information, tokens or objects, that are processed by the knowledge source. The system would only have to check if an event was generated that indicates the creation of data that can be processed by the knowledge source. To implement this scheduling mechanism, each knowledge source contains a list of events that cause the activation of the knowledge source.

After a knowledge source has been activated by an event, the knowledge source may have a set of preconditions that must be true prior to executing the knowledge source. This is a case where the creation of new knowledge, resulting in an event, has activated the knowledge source. Execution of the knowledge source, however, may still not be possible because some additional data may not exist that is required by the knowledge source.

Associated with each knowledge source is a cost that indicates the computational requirements of the knowledge source. This cost is state information and used by the scheduler to determine the best knowledge source to execute at any point in time. In many instances, the cost of executing a knowledge source may be fixed, not requiring the knowledge source to recalculate the cost at run time. However, in some cases the cost of the knowledge source may not be fixed. As an example, a knowledge source may be very sensitive to the number of objects or tokens that are input to the knowledge source. In this case, the knowledge source must be capable of calculating the true cost at run time based on the current state of the knowledge database.

Along with the cost of a knowledge source, the scheduler requires an estimate by the knowledge source on the value of the information to be generated by the knowledge source. This score is called the estimated benefit of the knowledge source. The benefit of a knowledge source can vary given the current activity or goal of the system. For instance, if the knowledge source is a routine that constructs boxes from linear features found in the document, the benefit of this knowledge source would be higher if the system is focusing on a model that contains box features, rather than a model that does not contain boxes. As a result, a knowledge source must be capable of reevaluating the potential benefit based on the current state of the system.

Each knowledge source should maintain performance statistics that can be used in determining the cost and benefit attributes of the knowledge source. One statistic is the average CPU time required to execute the knowledge source. This data can be collected in a test environment and analyzed in order to accurately determine the cost of the knowledge source. In a more sophisticated implementation, the knowledge source can use this information to determine the true cost at run time. In this example, the knowledge source cost is adaptable to the live run time environment of the system.

Analogous to capturing data relative to cost, the knowledge source should also collect statistics pertaining to the ability of the knowledge source to produce information that contributes to the problem solution. Again, this data can be collected in a test environment or run time environment in order to estimate the benefit of a knowledge source.

The following is an example list of knowledge sources:

1. Clustering. This knowledge source partitions tokens into sets based on their location within the input image and token type. A data object providing access to a list of objects by region is the output of this knowledge source.
2. Horizontal Grouping. This knowledge source groups machine print and hand print tokens that are located close together on the x-axis, and are approximately at the same location on the y-axis. Objects representing lines of text or partial lines of text are the output of this knowledge source.
3. Vertical Grouping. This knowledge source groups machine print tokens, hand print tokens, and groups of machine print or hand print tokens that are related according to there location on the x-axis and y-axis. This knowledge source may eventually be implemented as multiple knowledge sources that search exclusively for different groupings of text, such as columns of text or blocks of text. Objects representing blocks of text or columns of data are the output of this knowledge source.
4. Simple Box Builder. This knowledge source locates simple boxes in the input image. Objects representing simple boxes in the input image are the output of this knowledge source.
5. Complex Box Builder. This knowledge source locates complex boxes in the input image. Objects representing complex boxes in the input image are the output of this knowledge source.
6. Enclosed Object Builder. This knowledge source locates objects or tokens that are enclosed in both simple and complex boxes. Objects representing this relationship are the output of this routine.
7. Token or Object Splitter. This knowledge source dissects large machine print or hand print fields that are intersected by lines and boxes into multiple tokens or objects. This routine compensates for inconsistencies that occur when the Net32K groups machine print or hand print features that are located closely together, as well as inconsistencies created by horizontal grouping. Objects or tokens, derived from the input set of objects or tokens, are the output of this routine.
8. Underline Object Builder. This knowledge source locates objects or tokens that are underlined in the image. Objects representing this relationship are the output of this routine.
9. Courtesy Amount Locator/Reader. This knowledge source determines if a specified zone in the input image is a courtesy amount field, based on the presence of a '$' or '*' character. The knowledge source also attempts to read the field. The output of the knowledge source is a confidence value indicating if the field is a courtesy amount field, as well as the contents of the field.
10. Legal Amount Reader. This knowledge source is responsible for reading legal amount fields from checks. The knowledge source outputs the results of the legal amount reader.
11. OCR Engines. This knowledge source provides an interface to OCR engines in order to perform character recognition. This knowledge source outputs the results of the invoked OCR engine.
12. Contextual Analysis. This knowledge source provides the ability to perform contextual analysis of the results returned from the field understanding engines. This gives the system the ability to perform reasoning based on the contents of a field. For example, if the word AMOUNT is read from the image, the system needs the ability to make use of this information in locating the courtesy amount zone. At the present time, the proper use of this knowledge source or knowledge sources has not be completely explored.

13. Header Analysis. This knowledge source provides the capability to search for combinations of objects and/or tokens that form a field header and field value relationship. For example, if the document contains the word AMOUNT or TOTAL, in many cases the courtesy amount can be found beside or below this text. This relationship may also be found based solely on the location of tokens or objects. Objects representing this relationship are the output of the knowledge source.

14. U.S. Personal Check Verification. This knowledge source is called to verify that the current document matches the layout of a U.S. personal check. If the document is a U.S. Personal Check, the knowledge source outputs the location of the relevant fields in the image.

15. Document Identification. The document identification knowledge source provides an interface to the document identification engine previously developed by the HITC for identifying giros. This knowledge source is used to identify documents that contain linear features. On successful completion, this knowledge source outputs the identity of the document and the relevant field locations. The document analysis system can also align and validate the presence of field locations based on the document layout and locations of tokens. If the document is not identified, an unidentified status is returned.

16. Net32K System. While the Net32K output is considered an input to the document analysis system, as performance data becomes available it may be possible to optimize performance of the Net32K subsystem based on the run time environment. It may be possible to treat the software component that translates feature maps to tokens as individual knowledge sources. In this manner, the system will request processing of feature maps as needed, avoiding unnecessary computation. For instance, if the document distribution indicates that the document stream contains a large percentage of giros, line feature extraction can be performed initially. If there are a large number of lines present in the image, the Document Identification knowledge source can be scheduled to identify the document. If the document is successfully identified, the additional step of processing machine print features and hand print features can be avoided. Tokens are the output of this knowledge source.

C. Control Means

At any point in time, the system consists of a set of knowledge sources that can be executed to create new information that is used to construct new hypotheses or support current hypotheses. Since knowledge sources are activated with respect to a data object or a set of data objects, it is possible that a single knowledge source can be ready to execute upon the creation of a single data object. As described earlier, the computational power required by knowledge sources varies by the function being performed. The job of the control means is that of a scheduler, to select the best knowledge source given the state of the system.

Figure 9:
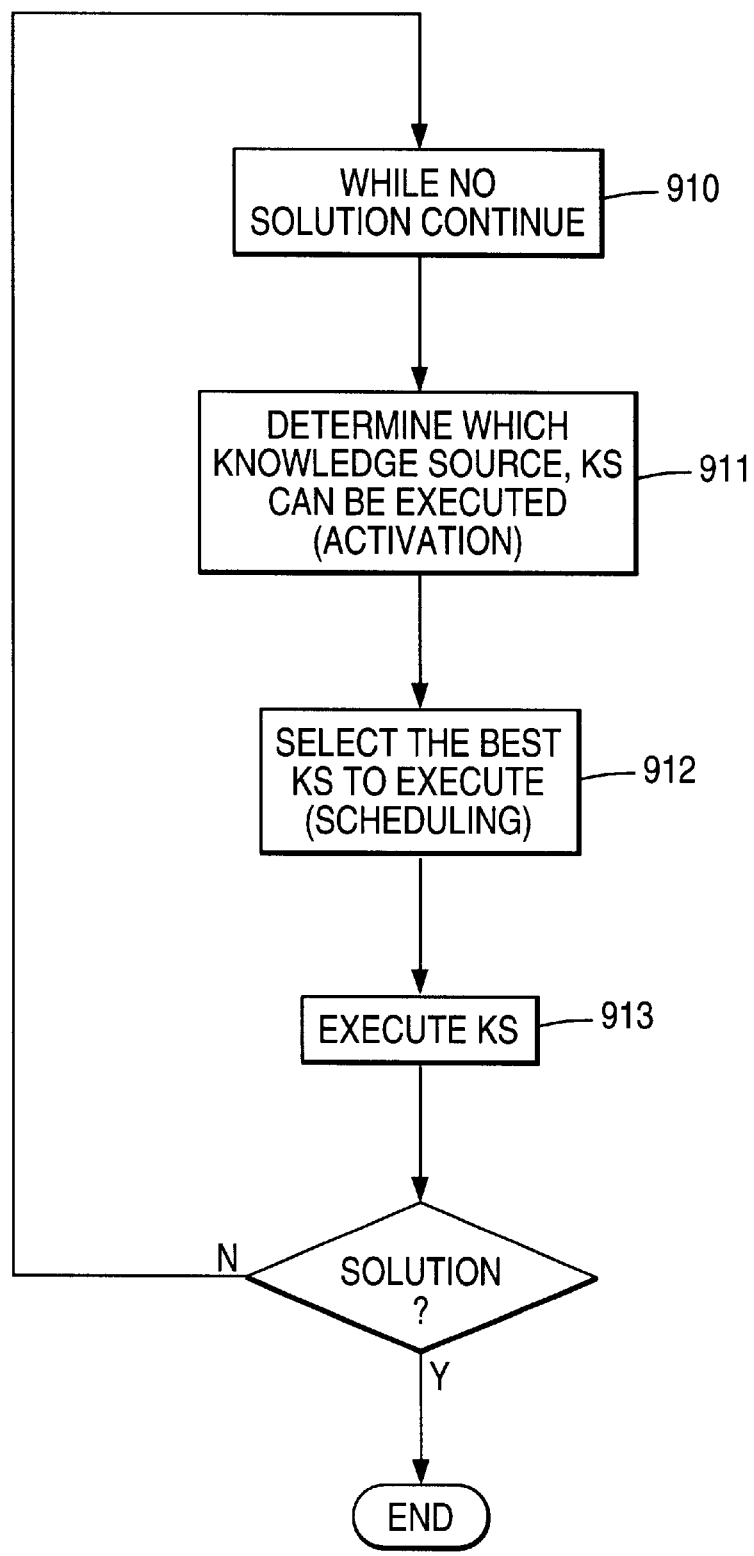
FIG. 9 is a flow chart of the control means execution cycle.

First, a high level description of the control means is given below and in FIG. 9. Reference numerals in FIG. 9 are enclosed in brackets ([]) on the lines of pseudo code. In the sections that follow, a more detailed breakdown of each component in the control means is given. The following defines the high level control means for the system.

```
[910] while no solution
        [911] determine which knowledge sources can
              be executed (ACTIVATION)
        [912] select the best knowledge source to
              execute (SCHEDULING)
        [913] execute the knowledge source
      end while
```

As shown by the pseudo code given above and FIG. 9, the control means is divided into three components. First, knowledge sources must be activated 911. Activation in this context refers to some event in the system that makes it possible to run a knowledge source. Second, from the set of activated knowledge sources, the system must select the best knowledge source to execute based on some selection criteria 912. This is a scheduling process. Finally, the knowledge source is executed, resulting in an update in the current state of the system 913. Each loop through the scheduler loop is termed an execution cycle.

In general, a knowledge source is a function that processes a set of input data, tokens or complex objects, and produces a set of output data, new or updated complex objects, as well as hypotheses. By definition, a knowledge source cannot be executed until the set of input data required by the knowledge source exists in the knowledge database. Also, it is possible to define a set of conditions on the inputs or state of the knowledge database that must be met prior to executing the knowledge source. These conditions may pertain to the presence of specific knowledge concerning the inputs or specific state information relevant to the system. As a result, a knowledge source may exist in three states: idle, active and executing.

In the idle state, the knowledge source is not bound to a set of input objects, meaning there is no context for the knowledge source to process. In the activated state, the knowledge source has been triggered and bound to a specific context, but cannot be executed because all of the knowledge source preconditions have not been met. In the executing state, the knowledge source has been triggered and all preconditions have been met in the given context.

To manage the knowledge source states, two queues could be implemented, the activation queue (ACTIVE) and the executable queue (EXECUTE). An idle queue is not necessary, since each knowledge source is always in the idle state. Given the three states listed above, the primary requirement is to define an efficient mechanism that can be used to activate knowledge sources and evaluate their preconditions.

The simplest mechanism available for event activation is to scan the current knowledge database looking for new objects or objects that have been updated. If these objects are found, the scheduler can then search the set of knowledge sources to determine if a knowledge source can be activated within the context of the new or modified object. However, as the knowledge base and the set of knowledge sources grows, this search method becomes computationally inefficient.

Figure 10:
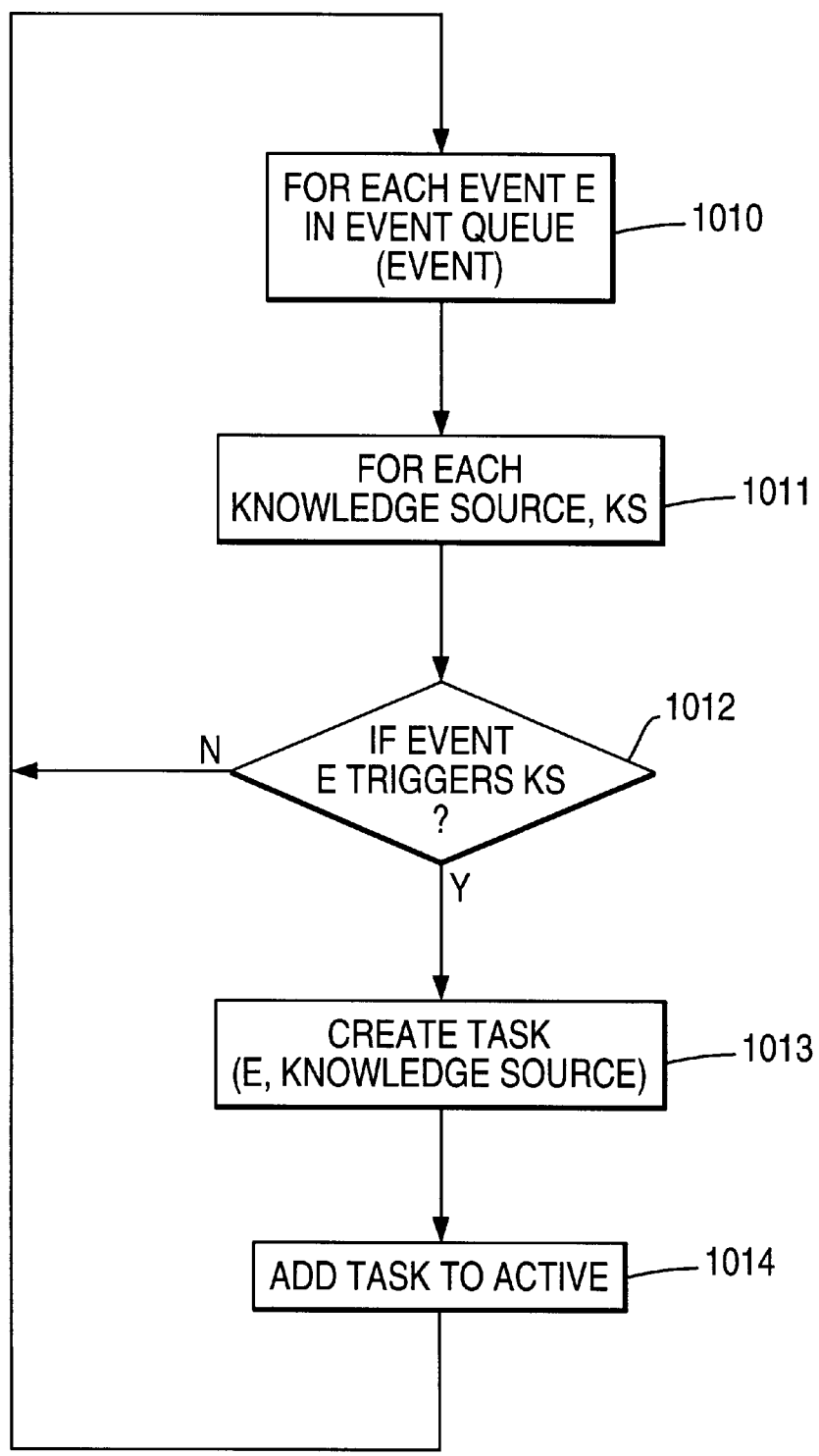
FIG. 10 is a flow chart of the event handler.

The mechanism selected for event activation is an event queue (EVENT). When objects in the knowledge database are updated or additional objects are added, an event is generated and added to the event queue. Rather than have a knowledge source be activated by the presence of a specific piece of knowledge, knowledge sources are activated by events (triggers) that are generated by other knowledge sources in the system. An event consists of an event identifier and a pointer to the data object that was responsible for the event. Associated with each knowledge source are a list of events that cause a knowledge source to be activated. As shown below and in FIG. 10, the first step of the ACTIVATION step is to process the current set of events 1010–1012, resulting in the creation of knowledge source contexts (tasks) 1013. A task is an executable entity that is the result of binding a knowledge source and an object. After a task is created, the task is added to the active queue (ACTIVATE) 1014.

```
[1010] for each event, E
        [1011] for each knowledge source, KS
                [1012] if E ∈KS.triggers
                        [1013] create a task, <E,KS>
                        [1014] add task to ACTIVE
                    endif
            endfor
    endfor
```

After a task has been created, the system must evaluate the task preconditions to determine if the task is executable. Since the state of the system changes each time through the scheduler loop, these preconditions need to be evaluated each execution cycle of the scheduler.

Figure 17:
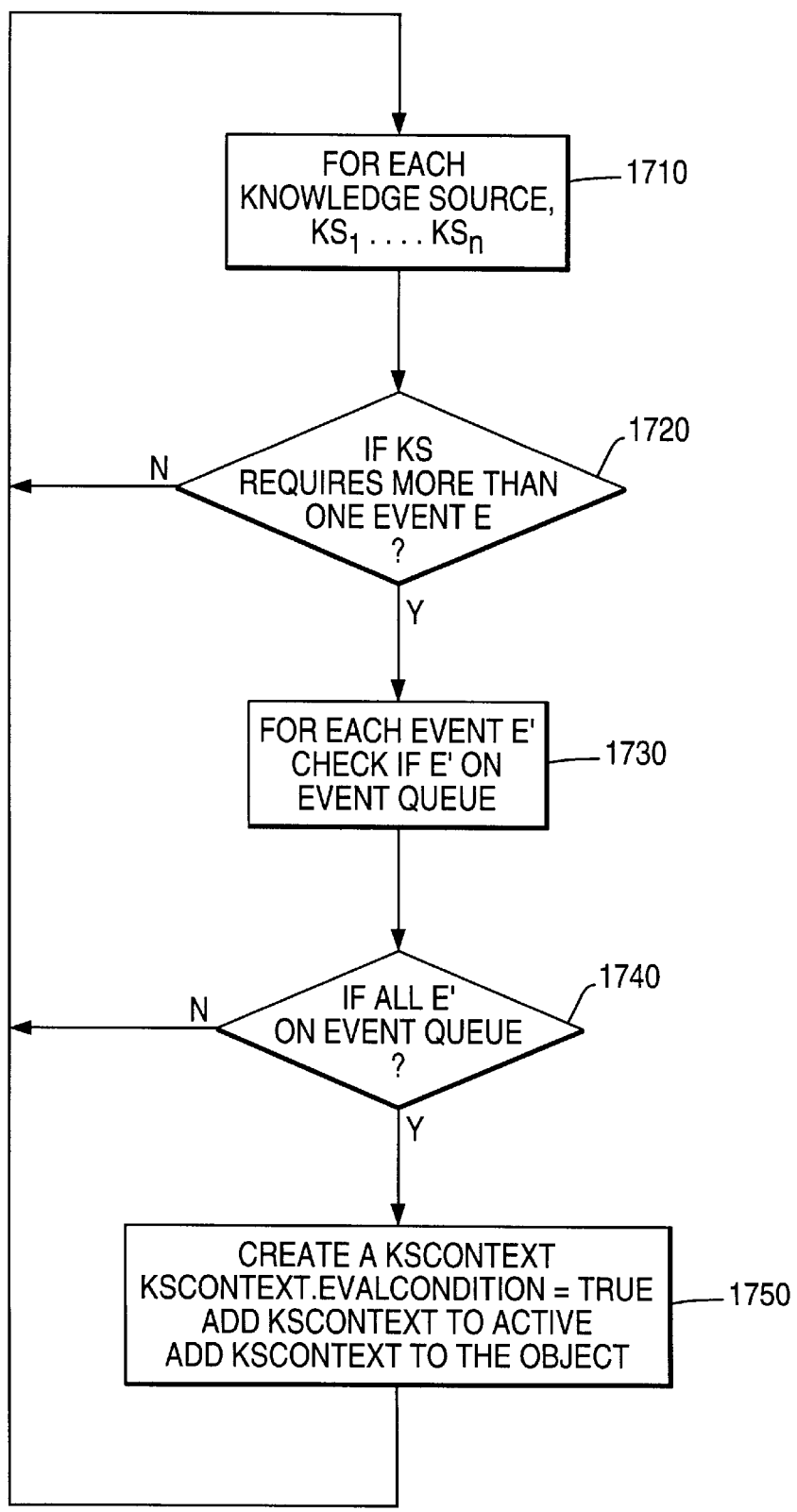
FIG. 17 is a flow chart for checking if a knowledge source requires more than one event.
Figure 18:
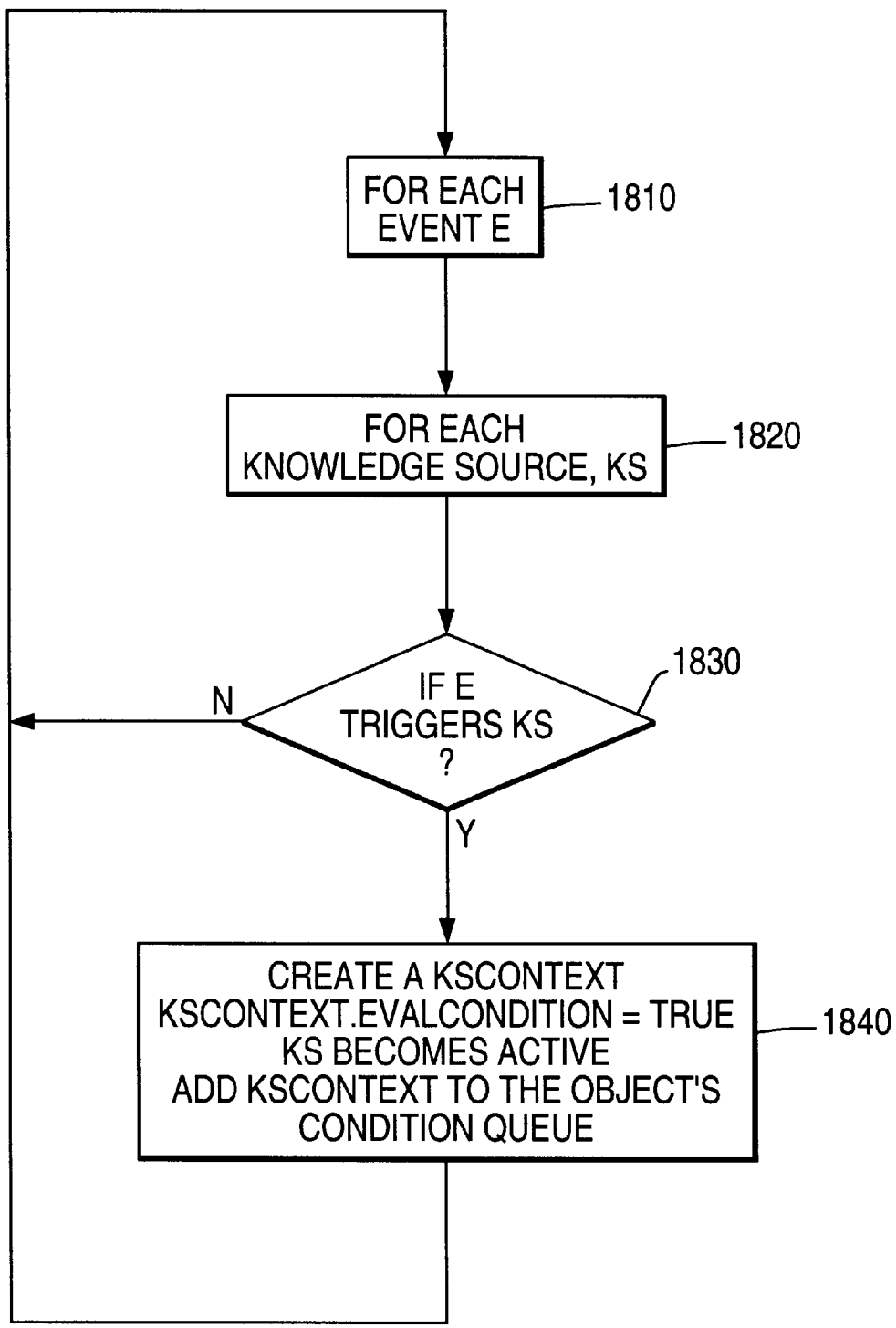
FIG. 18 is a more detailed flow chart of the control means execution cycle.
Figure 19:
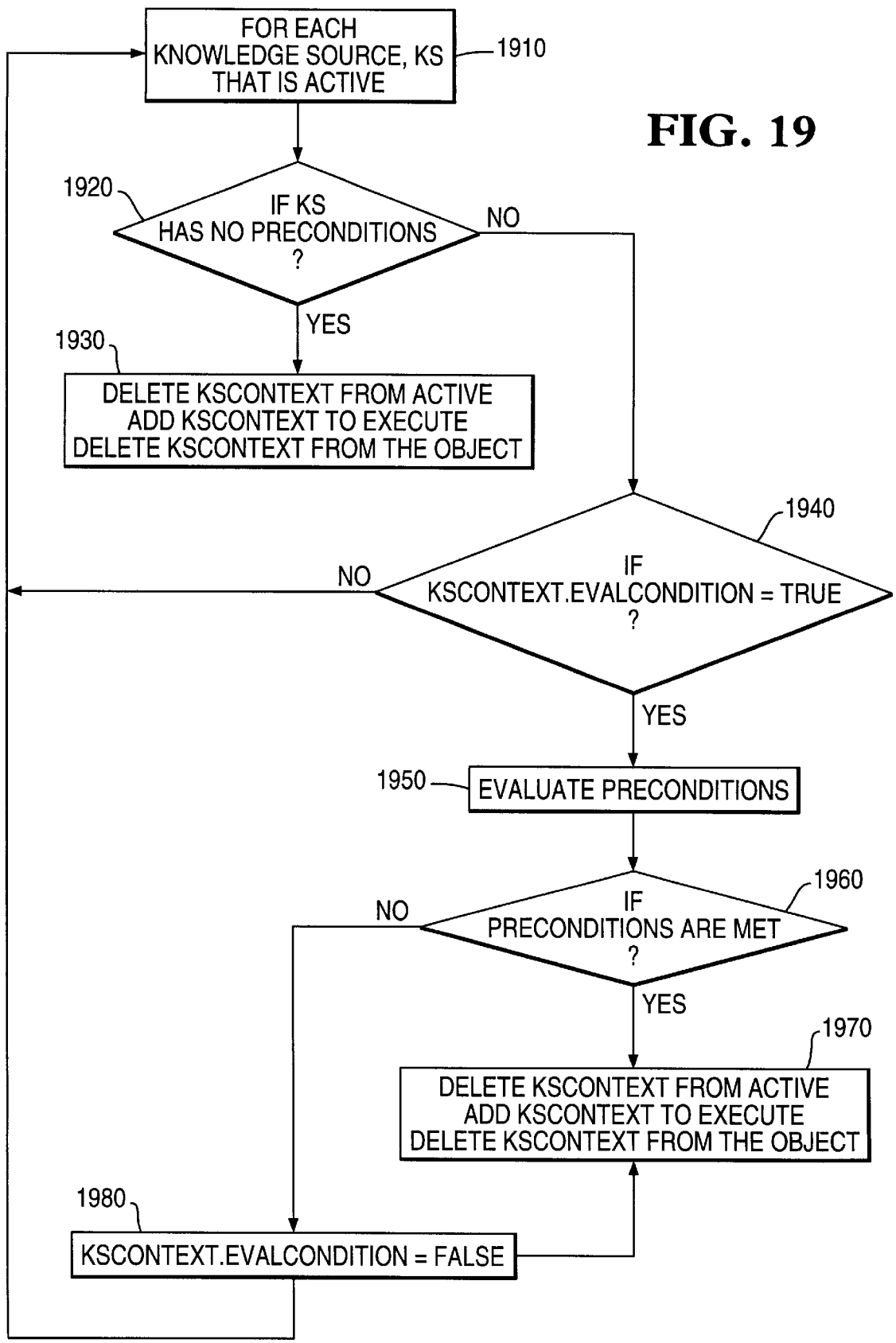
FIG. 19 is a more detailed flow chart of the event handler.

Similar to event activation, the simplest mechanism available for condition evaluation is to scan the ACTIVE queue evaluating the preconditions for each knowledge source context. If all preconditions for a knowledge source context are met, then the knowledge source context can be added to the EXECUTE queue. However, as the number of knowledge source contexts on the ACTIVE queue grows, the processing required to evaluate each precondition can grow out of control. Also, it is wasteful to reevaluate each precondition. In many cases, if no new knowledge has been created that can affect the precondition, there is no need to reevaluate the precondition. As a result, the goal is to create a mechanism that causes preconditions to be updated when the knowledge source context is updated, i.e. state information about the object is modified. FIGS. 17–19 flow chart this mechanism and the pseudo code is given below with reference numerals enclosed in brackets ([]).

To meet these requirements, a link must be added so that given a specific object, the system can determine the knowledge contexts that are impacted by the object update. A link already exists from the knowledge source to the object, since a task is a pairing of a knowledge source and an object to be processed by the knowledge source. To achieve a link from the object to the set of preconditions associated with knowledge source, a link must exist between the object and the task. This link is initialized when the task is initially added to the ACTIVE queue 1750, 1840. When a task becomes executable, the link is removed so that preconditions are no longer evaluated 1970.

After a linkage has been created, the systems needs a mechanism to trigger the evaluation of the precondition. The evaluation of preconditions can be performed at two points. One possibility is when an object is updated, the knowledge source updating the object can determine if the object should trigger the evaluation of preconditions. If so, the knowledge source can follow the link to the task and invoke the routine to evaluate the preconditions. This method is not optimal, since if multiple objects are being updated by a knowledge source, the preconditions would be evaluated on each object update.

A more efficient method is to update a flag contained in the task to indicate that the precondition needs to be updated 1840. In this case, as the scheduler traverses the ACTIVE queue to determine if a task can be moved to the EXECUTE queue, only preconditions of knowledge sources marked out-of-date are updated 1940. This guarantees that the preconditions are evaluated only once per execution cycle, after the knowledge base update is complete 1950–1970.

Since objects and tokens are responsible for updating their own attributes, these objects will also be responsible for updating the list of tasks to which the object is linked. Also, knowledge sources can have more than one event that must occur before the knowledge source can execute.

In addition to the event handler and the evaluation of preconditions, a Knowledge Source may require more than one event before it can execute. If so, all events that trigger the Knowledge Source must exist or be on the EVENT queue. If all the events are on the EVENT queue then the Knowledge Source is ready to be executed and is placed on the ACTIVE queue 1750.

The following pseudo code contains the modifications to check if a knowledge source requires more than one event 1710–1750, the modifications to the event handler 1810–1840, along with the additional pseudo code required to evaluate preconditions 1910–1980.

```
[1710] for each knowledge source, KS
        [1720] If knowledge source, KS requires more than
                1 event E to execute
                [1730] for each event E' that triggers KS
                        [1730] check if E' on event queue, EVENT
                    end for
                [1740] if all events E' exist on EVENT
                        [1750] create a KSContext,
                                <E->object, KS>
                        [1750] KSContext.evalCondition = TRUE
                        [1750] add KSContext to ACTIVE
                        [1750] add KSContext to the object's
                                condition queue, E->object.contextQ
                    endif
            endif
    end for
[1810] for each event, E
        [1820] for each knowledge source, KS
                [1830] if E ∈KS.triggers
                        [1840] create a KSContext,
                                <E->object, KS>
                        [1840] KSContext.evalCondition = TRUE
                        [1840] add KSContext to ACTIVE
                        [1840] add KSContext to the object's
                                condition queue,
                                E->object.contextQ
                    endif
            endfor
    endfor
[1910] for each KSContext on ACTIVE
        [1920] if KSContext has no preconditions
                [1930] delete KSContext from ACTIVE
                [1930] add KSContext to EXECUTE
                [1930] delete KSContext from
                        KSContext->object.contextQ
        [1940] else if KSContext.evalCondition = TRUE
                [1950] evaluate preconditions
                [1960] if preconditions are met
                        [1970] delete KSContext from ACTIVE
                        [1970] add KSContext to EXECUTE
                        [1970] delete KSContext from
                                KSContext->object.contextQ
                    endif
                [1980] KSContext.evalCondition = FALSE
            endif
    endfor
```

Scheduling a knowledge source for execution consists of selecting the appropriate task from the execution queue (EXECUTE) based on a cost/benefit analysis, deleting the task from the execute queue, and invoking the task or knowledge source. In systems that support parallel processing capabilities, task scheduling can be more complex, since it may be possible to select more than one task for execution. In a multiprocessing environment, the scheduler must be capable of selecting tasks on the basis of computational resource availability, potential problems related to concurrent data access, as well as cost/benefit. As a result of the added complexity, and no current requirements for parallel processing, the task selection is based completely on a cost/benefit analysis.

Since cost and benefit are an attribute of knowledge sources, the scheduler calculates a cost/benefit score for each knowledge source and then selects the best knowledge source to execute. The current system calculates the score as benefit—cost, with the highest score being the best knowledge source to execute. The score is calculated from the benefit and cost values assigned to each knowledge source. The benefit and cost values are assigned during development of the system. The benefit value represents the value the information computed by the knowledge source has towards obtaining an answer. The cost is a value representing the cost of running the knowledge source. The score is computed by the benefit minus the cost.

The system recalculates the cost/benefit score each execution cycle of the control module, rather than maintaining an ordered list of tasks based on the cost/benefit score. In some instances, it may still be necessary to reevaluate the cost/benefit scores due to changes in the state of the system, i.e. the focus of attention (explained below), even if an ordered list is implemented.

On each execution cycle through the scheduler loop, the control module selects the next activity to pursue by the system based on the cost/benefit score. This implies that the scheduling mechanism is data driven, since knowledge sources become executable on the creation of specific data or knowledge. This process is basically a bottom-up problem solving approach. While this scheduling method is satisfactory for generating a solution, it is not the most efficient mechanism available for guiding the system to the problem solution.

A more efficient method is to design the system so that it is goal driven, where the current goal of the system impacts the set of executable knowledge sources, as well as the cost/benefit analysis of each executable knowledge source. This is called the focus of attention (FOA). The FOA includes fine tuning the benefit value based on the knowledge source context. For example, rather than simply calculating the score using the benefit and the cost for each knowledge source, a third value which would represent any existing knowledge the system has in the knowledge database can be introduced to the equation for calculating the score.

As knowledge is generated by the system, various types of hypotheses are created by the system. The obvious goal of the system is to generate additional information that provides evidence to either support the hypotheses or prove the hypotheses false. As previously described, hypotheses are generated by mapping information from objects and tokens to models of fields. Therefore, if the goal of the system is to locate the courtesy amount field, the system should place a priority on the knowledge sources that generate information required by the courtesy amount field model. By adding these capabilities to the scheduler, the system will evolve from a bottom-up, data driven reasoning system to a top-down, model based reasoning system.

Hypotheses, the creation and updating of individual hypotheses are implemented as knowledge sources in the document analysis system. Since knowledge sources can be triggered based on the occurrence of one or more events, the knowledge sources that manage hypotheses can be triggered when new knowledge is created by any of the knowledge sources in the system. Specifically, since the system supports three types of hypotheses, field level, document composition, and document classification, each type of hypothesis has a corresponding knowledge source for creating and updating the corresponding types of hypotheses.

Field level hypotheses can be created, updated, or deleted as soon as any new information becomes available to the system. For instance, if the knowledge source for identifying machine print tokens enclosed within boxes executes and generates new information, i.e. new objects, then the new objects are candidates for possible hypothesis creation or update. If the system has already created a hypothesis about the machine print field contained within the object, then the hypothesis must be updated based on the new information available. The new information can increase the confidence value of a hypothesis, or can result in a decrease in the confidence value for the hypothesis. If the decrease in the confidence value is great, the hypothesis can actually be discarded. Even if there is a hypothesis associated with the object, the system also attempts to create new hypotheses based on the new information. This is because the system must be capable of managing multiple hypotheses associated with a single object.

Document classification hypotheses are created based on very general document features, such as the percentage of hand print tokens in the image or the number of lines in the image. Since this information is generally available on system startup from the Net32K, these hypotheses can be made early in the processing of the image. Also, information generated during the processing of the image may have little impact on these hypotheses.

Figure 11:
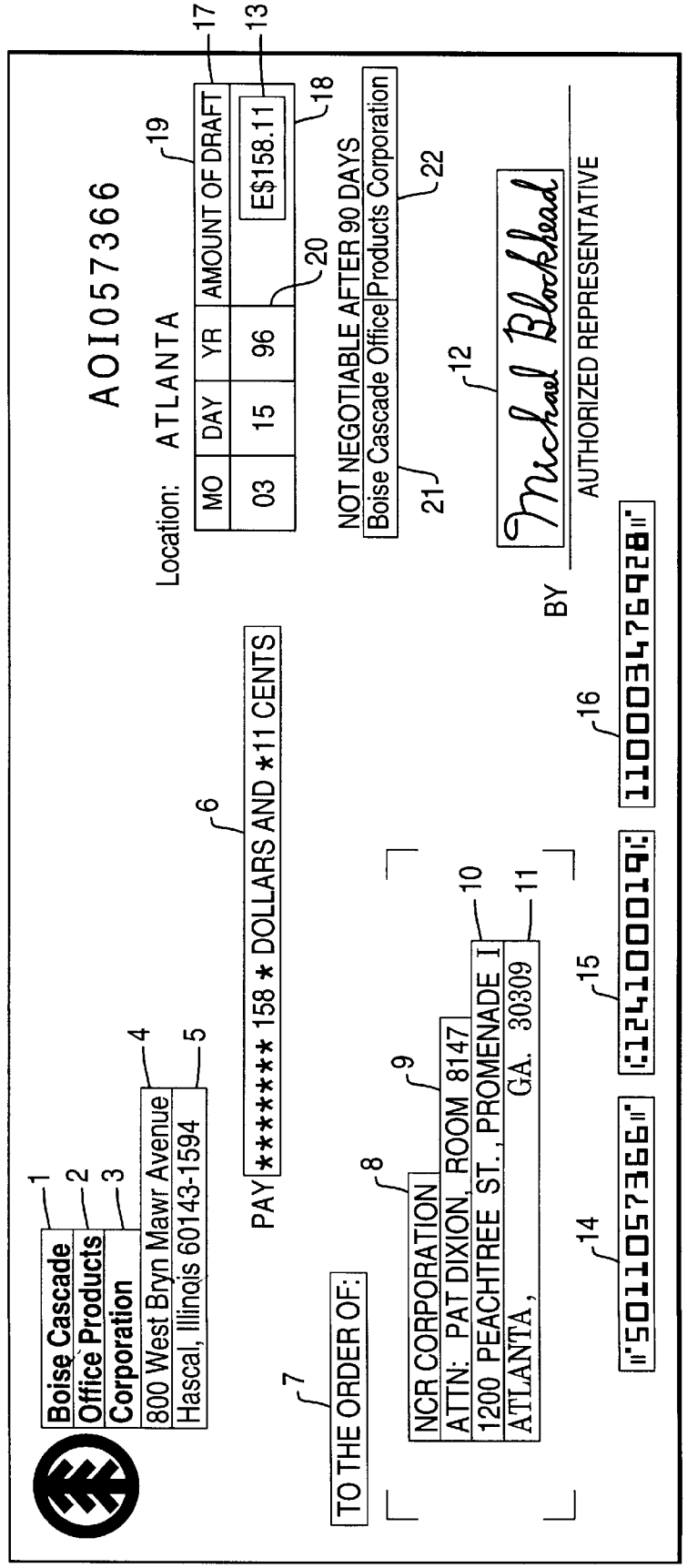
FIG. 11 is a business check with tokens.

An example of how the system would locate the relevant fields of an unconstrained document is given below using FIG. 11, a business check. Tokens returned by Net32K are numbered and enclosed in boxes for ease of reference only.

1. MICR Location Knowledge Source—Looks at the Net32K tokens and rules out unlikely candidates (i.e. hand print tokens). Takes the likely tokens and compares them against MICR zone of the business document model file. Although three tokens were returned by Net32K (14–16), this knowledge source puts the tokens together and compares tokens 14–16 against the MICR zone in the business document file. These tokens are returned with the highest confidence value.
2. Simple Box Builder Knowledge Source—Looks for intersections of horizontal and vertical lines. Starts looking at any relationships between machine print or hand print enclosed in boxes. For example the box formed by lines 17–20 in FIG. 11 forms a box. Token 13 is partly enclosed within the box. This knowledge source therefore formulates information regarding the machine print token 13 positioned within a box.
4. Clustering Knowledge Source—Groups same type of tokens based on proximity. For example the tokens 7, 8, 9, 10, and 11 would be grouped into a cluster because of their proximity, as well as tokens 1, 2, 3, 4, and 5.
5. Horizontal Grouping Knowledge Source—Generates horizontal groupings of machine print tokens that are in close proximity. For example tokens 21 and 22 would be grouped together.
6. Vertical Grouping Knowledge Source—Generates vertical groupings of the horizontal groupings. Tokens 7, 8, 9, 10, and 11 would be a vertical cluster.
7. Hypotheses—Takes groupings and compares against the zones in the document model file for a business check and gets back confidence values.

8. Hand Print Grouping Knowledge Source—Horizontal grouping of hand print tokens. For example, if the signature token 12 was represented by two tokens, these tokens would be grouped together.
9. Hypotheses—Takes hand print groupings and compares against the zones in the document model file for a business check and gets back confidence values.
10. The groupings with the highest confidence values for the date, courtesy amount, signature, MICR and legal amount are output.
11. The groupings are sent for optical character recognition (OCR). If the character recognition engine cannot interpret the grouping sent then the grouping with the next highest confidence value is sent.

While the invention has been described in detail with specific reference to preferred embodiments thereof, it is understood that variations and modifications thereof may be made without departing from the spirit and scope of the invention.

What is claimed is:

1. A system for analyzing a target document including at least one informational element, the system comprising:
    (a) means for receiving a digitized image of the target document;
    (b) means for extracting low level features from the digitized image;
    (c) means for classifying the document based upon the extracted low level features from the digitized image to identify a most probable document type from a plurality of possible document classes that the target document most closely matches, wherein the means for classifying performs the steps of:
        (i) extracting a sample immediate feature set from at least one sample document for each document class, wherein each sample immediate feature set includes at least one feature of a sample document;
        (ii) Generating a sample indirect feature set for each sample document;
        (iii) generating a target document immediate feature set and a target document indirect feature set, the target document immediate feature set comprising information describing a location and a type indicator for basic image features of the target document, and the target document indirect feature set comprising information summarizing attributes of the immediate features in the target document immediate feature set;
        (iv) comparing the target document indirect feature set with each of the sample indirect feature sets; and
        (v) classifying the target document responsive to the comparison of step (iv) to determine the most probable document type for the target document; and
    (d) means for analyzing the target document in order to extract informational data associated with the at least one informational element based upon the most probable document type identified by the classifying means.

2. The system of claim 1, wherein the extracting means performs the steps of:
    (i) generating the coordinates of a region that encloses each of the at least one informational elements;
    (ii) generating a type indicator corresponding to the type of informational element located within the region;
    (iii) transmitting the coordinates and the type indicator to the classifying means.

3. The system of claim 2, wherein the region is a rectangle.

4. The system of claim 2, wherein the type indicator is generated to correspond to an informational type selected from the group of: machine print, hand print, vertical lines, horizontal lines or noisy regions.

5. The system of claim 1, wherein the at least one sample document may be selected from the group of: business check, deposit slip, giro or personal check.

6. The system of claim 1, wherein the sample immediate feature set may include a feature selected from the group of: machine print, hand print, vertical lines or horizontal lines.

7. The system of claim 1, wherein the sample indirect feature set may include a feature selected from the group of: image width, document boundary width, horizontal line total length, horizontal line total count, horizontal line average length, vertical line total length, vertical line total count, vertical line average length, machine print total area, machine print total count, machine print average area, hand print total area, hand print total count, hand print average area, machine print vs. hand print area ratio, machine print vs. hand print count ratio, machine print vs. hand print average area ratio, or total number of boxes.

8. The system of claim 1, wherein the analyzing means performs the steps of:
    (i) responsive to the classifying means, determining whether the target document is constrained;
    (ii) if the target document is constrained, selecting one of a plurality of document models that matches the target document; and
    (iii) locating the at least one information element of the selected target document and determining its type and value.

9. The system of claim 1, wherein the analyzing means performs the steps of:
    (i) responsive to the classifying means, determining whether the location and characteristics of zones of interest in the target document are unconstrained; and
    (ii) if so, determining the location and characteristics of the zones of interest, comprising steps of:
        (A) determining which of a plurality of knowledge sources may be executed;
        (B) selecting a best knowledge source to execute based on the type of the target document and any accumulated information for the target document; and
        (C) executing the best knowledge source in order to determine the type and value of the at least one information element;
        (D) accumulating information for the target document; and
        (E) deciding whether accumulated information for the target document is sufficient for substantially locating and characterizing at least one of the zones of interest of the target document, and if not, repeating steps (A)–(E) to assemble more information for the target document until at least one zone of interest are substantially located and characterized.

10. The system of claim 1, further comprising an optical character recognition device for converting the informational data into associated characters.

11. The system of claim 1, wherein the means for analyzing locates those zones of the target document that most likely contain the informational data based on the most probable document class determined for the target document.

12. A process for analyzing a target document including at least one informational element, comprising the steps of:
    (a) receiving a digitized image of the target document;

(b) extracting low level features from the digitized image;

(c) classifying the target document based upon the extracted low level features to identify a most probable document type from a plurality of possible document classes that the target document most closely matches, wherein the step of classifying comprises steps:

(i) extracting a sample immediate feature set from at least one sample document for each document class, and wherein each sample immediate feature set includes at least one feature of a corresponding sample document;

(ii) generating a sample indirect feature set for each sample document;

(iii) generating a target document immediate feature set and a target document indirect feature set, the target document immediate feature set comprising information describing a location and type indicator for basic image features of the target document, and the target document indirect feature set comprising information summarizing attributes of the immediate features in the target document immediate feature set;

(iv) comparing the target document indirect feature set with each of the sample indirect feature sets; and (v) classifying the target document responsive to the comparison of step (iv) to determine the most probable document type for the target document; and (d) analyzing the target document in order to extract informational data associated with the at least one informational element based upon the most probable document type.

13. The process of claim 12, wherein step (b) comprises the steps of:

(i) generating the coordinates of a region that encloses each of the at least one informational elements; and (ii) generating a type indicator corresponding to the type of informational element located within the region.

14. The process of claim 13, wherein the region is a rectangle.

15. The process of claim 13, wherein the type indicator is generated to correspond to an informational type selected from the group of: machine print, hand print, vertical lines, horizontal lines or noisy regions.

16. The process of claim 12, wherein the at least one sample document may be selected from the group of: business check, deposit slip, giro or personal check.

17. The process of claim 12, wherein the sample immediate feature set may include a feature selected from the group of: machine print, hand print, vertical lines or horizontal lines.

18. The process of claim 12, wherein the sample indirect feature set may include a feature selected from the group of: image width, document boundary width, horizontal line total length, horizontal line total count, horizontal line average length, vertical line total length, vertical line total count, vertical line average length, machine print total area, machine print total count, machine print average area, hand print total area, hand print total count, hand print average area, machine print vs. hand print area ratio, machine print vs. hand print count ratio, machine print vs. hand print average area ratio, or total number of boxes.

19. The process of claim 12, wherein step (d) comprises the steps of:

(i) responsive to the classifying step, determining whether the target document is constrained; and (ii) if the target document is constrained, locating the at least one information element of the target document responsive to the classification step and determining its type and value.

20. The process of claim 12, wherein the analyzing means performs the steps of:

(i) responsive to the classifying means, determining whether the location and characteristics of zones of interest in the target document are unconstrained; and (ii) if so, the location and characteristics of the zones of interest, comprising steps of:

(A) determining which of a plurality of knowledge sources may be executed;

(B) selecting a best knowledge source to execute based on the type of the target document and any accumulated information for the target document; and (C) executing the best knowledge source in order to determine the type and value of the at least one information element;

(D) accumulating information for the target document; and (E) deciding whether accumulated information for the target document is sufficient for substantially locating and characterizing at least one of the zones of interest of the target document, and if not, repeating steps (A)–(E) to assemble more information for the target document until all zones of interest are substantially located and characterized.

21. The process of claim 12, wherein the analyzing step comprises the step of locating those zones of the target document that most likely contain the informational data based on the most probable document class determined for the target document.

* * * * *